US009932873B2

(12) United States Patent
Aoki

(10) Patent No.: US 9,932,873 B2
(45) Date of Patent: Apr. 3, 2018

(54) EXHAUST GAS PURIFYING DEVICE

(71) Applicant: NGK INSULATORS, LTD., Nagoya (JP)

(72) Inventor: Takashi Aoki, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 14 days.

(21) Appl. No.: 15/258,218

(22) Filed: Sep. 7, 2016

(65) Prior Publication Data
US 2017/0082005 A1    Mar. 23, 2017

(30) Foreign Application Priority Data

Sep. 18, 2015  (JP) ................................. 2015-185814
Apr. 28, 2016  (JP) ................................. 2016-090014
Aug. 2, 2016   (JP) ................................. 2016-152169

(51) Int. Cl.
*F01N 3/20*     (2006.01)
*F01N 3/28*     (2006.01)
(Continued)

(52) U.S. Cl.
CPC ......... *F01N 3/2842* (2013.01); *B01D 46/247* (2013.01); *B01D 46/2422* (2013.01); *B01D 46/2429* (2013.01); *B01D 46/2459* (2013.01); *B01D 46/2462* (2013.01); *B01D 53/94* (2013.01); *B01D 53/944* (2013.01); *B01J 35/04* (2013.01); *F01N 3/0222* (2013.01); *F01N 3/2828* (2013.01); *F01N 13/0097* (2014.06); *B01D 53/9454* (2013.01); *B01D 2046/2433* (2013.01); *B01D 2046/2481* (2013.01); *B01D 2255/915* (2013.01);
(Continued)

(58) Field of Classification Search
CPC .. F01N 2/2842; F01N 13/0097; F01N 3/2022; F01N 3/2828; B01D 2255/915; B01D 2255/9202; B01D 53/9454
USPC ................................... 422/177, 180; 55/523
See application file for complete search history.

(56) References Cited

U.S. PATENT DOCUMENTS 7,238,217 B2 *  7/2007  Cutler ................ B01D 46/2429
                                               55/385.3
7,244,284 B2    7/2007  Miwa et al.
(Continued)

FOREIGN PATENT DOCUMENTS

EP    1745848 A1 *  1/2007 ......... B01D 46/2429
EP    2 380 649 A1    10/2011
(Continued)

OTHER PUBLICATIONS

Extended European Search Report (Application No. 16188945.6) dated Feb. 8, 2017.

*Primary Examiner* — Tom P Duong
(74) *Attorney, Agent, or Firm* — Burr & Brown, PLLC

(57) ABSTRACT

An exhaust gas purifying device includes a honeycomb catalyst body, a plugged honeycomb structure and a can member to receive therein the honeycomb catalyst body and the plugged honeycomb structure, and the plugged honeycomb structure disposed at a position on a downstream side of the honeycomb catalyst body is designed so that a pressure loss in an end face central region of at least one of a second inflow side end face and a second outflow side end face of a second honeycomb substrate is larger than a pressure loss of an end face circumferential region positioned around the end face central region.

12 Claims, 9 Drawing Sheets

(51) Int. Cl.
*B01D 46/24* (2006.01)
*B01D 53/94* (2006.01)
*B01J 35/04* (2006.01)
*F01N 3/022* (2006.01)
*F01N 13/00* (2010.01)

(52) U.S. Cl.
CPC .............. *B01D 2255/9202* (2013.01); *B01D 2255/9205* (2013.01); *F01N 2240/20* (2013.01); *F01N 2330/48* (2013.01); *F01N 2330/60* (2013.01); *F01N 2340/02* (2013.01); *F01N 2470/02* (2013.01); *Y02T 10/20* (2013.01); *Y02T 10/22* (2013.01)

(56) References Cited

U.S. PATENT DOCUMENTS

| | | | |
|---|---|---|---|
| 9,073,289 B2 * | 7/2015 | Tamai | B32B 3/12 |
| 2003/0097834 A1 * | 5/2003 | Gabe | B01D 46/2425 |
| | | | 60/297 |
| 2004/0258582 A1 | 12/2004 | Miwa et al. | |
| 2014/0041350 A1 | 2/2014 | Aoki | |

FOREIGN PATENT DOCUMENTS

| | | |
|---|---|---|
| EP | 2 698 191 A1 | 2/2014 |
| EP | 2 380 649 B1 | 4/2015 |
| JP | 2001098925 A * | 4/2001 |
| JP | 2003-254034 A1 | 9/2003 |
| JP | 5584487 B2 | 9/2014 |

* cited by examiner

EXHAUST GAS PURIFYING DEVICE

The present application is an application based on JP 2015-185814 filed on Sep. 18, 2015, JP2016-090014 filed on Apr. 28, 2016 and JP2016-152169 filed on Aug. 2, 2016 with Japan Patent Office, the entire contents of which are incorporated herein by reference.

BACKGROUND OF THE INVENTION

Field of the Invention

The present invention relates to an exhaust gas purifying device, and more particularly, it relates to an exhaust gas purifying device which is capable of efficiently removing particulates in an exhaust gas emitted from a direct injection type gasoline engine and efficiently purifying the exhaust gas.

Description of the Related Art

In recent years, to meet activation of environmental protection movement and various requirements for resource saving, energy saving and the like, there has been advanced the development of an engine which is excellent in fuel economy performance and enables long-distance and long-time running in a state where consumption of fuel such as gasoline is decreased and an amount of an exhaust gas to be emitted is decreased. Especially in a gasoline engine which is frequently used as a driving source of a car, to satisfy a request for the above-mentioned decrease of the fuel consumption, there has been advanced development of a technology concerned with a direct injection type gasoline engine which is driven by directly injecting the fuel into a cylinder.

In a conventional usual gasoline engine, differently from the above "direct injection type", "a suction port fuel injection type" is mainly employed. In the gasoline engine in which this suction port fuel injection type is employed, it is possible to suppress an amount of a particulate matter (PM) such as soot to be generated, and influences of the particulate matter on atmospheric pollution or natural environment are not especially large. However, there has been the problem that this gasoline engine is poor in fuel economy performance as compared with the direct injection type gasoline engine.

On the other hand, in the direct injection type gasoline engine, the decrease of the fuel consumption can be promoted as compared with the usual gasoline engine. However, the amount of the particulate matter to be generated is excessively larger than before, and it is necessary to emit the exhaust gas including the generated particulate matter to atmospheric air through an appropriate treatment. That is, the treatment of the particulate matter becomes complicated, and a device or equipment concerned with the treatment is required.

On the other hand, in a diesel engine to be mounted in a large truck or the like, a trapping filter (an exhaust gas purifying device) in which a honeycomb structure is used is attached to the diesel engine for the purpose of removing a particulate matter in an exhaust gas which is generated by an operation of the diesel engine. As the honeycomb structure for use in the exhaust gas purifying device, there is mainly used a plugged honeycomb structure (see Patent Document 1) including plugging portions with which both ends are plugged in accordance with a predetermined arrangement standard. In consequence, the exhaust gas emitted from the diesel engine flows into the above plugged honeycomb structure, and passes through partition walls of the plugged honeycomb structure which are made of a porous ceramic material, whereby the particulate matter is trapped by the partition walls and deposited thereon.

As a result, the particulate matter in the exhaust gas emitted from the diesel engine can be removed by the trapping filter, and the gas passed through the trapping filter can be converted to a purified gas. However, fuel for use in the diesel engine is different from that in the gasoline engine, and hence even when the above trapping filter for the diesel engine is used as it is in the gasoline engine, the particulate matter cannot efficiently be removed.

To eliminate such a problem, the present applicant has already suggested the development of an exhaust gas purifying device which is capable of efficiently removing a particulate matter included in an exhaust gas of a direct injection type gasoline engine and is especially capable of exerting a high purifying performance even immediately after the start of the engine without increasing a pressure loss when treating the exhaust gas (see Patent Document 2).

[Patent Document 1] JP-A-2003-254034
[Patent Document 2] JP5584487

SUMMARY OF THE INVENTION

When the above-mentioned exhaust gas purifying device described in Patent Document 2 is used, an exhaust gas emitted from a direct injection type gasoline engine can efficiently be purified and treated by utilizing a trapping filter in which a honeycomb structure is used. In this exhaust gas purifying device, a honeycomb catalyst body onto which a three-way catalyst is loaded is further disposed at a position on an upstream side of a plugged honeycomb structure in which parts of cells are plugged, and for the purpose of decreasing a heat capacity of the honeycomb catalyst body, there is used a thin plate-shaped honeycomb catalyst body in which a length in a cell central axis direction is shorter than that of the plugged honeycomb structure.

In the exhaust gas purifying device, a larger amount of the exhaust gas flows through an end face central region corresponding to a region in the vicinity of an end face center (middle) in the honeycomb catalyst body and the plugged honeycomb structure, and the exhaust gas hardly flows through an end face circumferential region positioned around the end face central region. That is, in the exhaust gas purifying device, unevenness occurs in the flow of the exhaust gas. For example, in the vicinity of the end face central region in which a large amount of exhaust gas flows, a large amount of a particulate matter is trapped, and in the other region (the end face circumferential region), the particulate matter is hardly trapped. In this way, large unevenness occurs in the trapping regions of the particulate matter.

Thus, the particulate matter is easily deposited on partition walls of cells of the end face central region, and by a purifying treatment of the particulate matter over a long period of time, there might be caused a defect that the cells of the end face central region are clogged. Furthermore, due to the deposition of the particulate matter, a pressure loss might increase. Therefore, there might occur the problem that a purifying efficiency and a purifying performance of the particulate matter in the exhaust gas purifying device remarkably deteriorate.

Furthermore, also in the honeycomb catalyst body positioned on the upstream side of the plugged honeycomb structure, the exhaust gas hardly flows similarly in the end face circumferential region positioned around the end face central region. Consequently, in an effective cross section of the honeycomb catalyst body, there occurs the problem that the exhaust gas is not efficiently purified.

Thus, the present invention has been developed in view of the above actual circumstances, and an object thereof is to provide an exhaust gas purifying device in which an exhaust gas emitted from a direct injection type gasoline engine evenly flows into end faces of a plugged honeycomb structure and a honeycomb catalyst body and which is capable of stabilizing a purifying efficiency of a particulate matter and efficiently purifying the exhaust gas.

According to the present invention, there is provided an exhaust gas purifying device in which the above objects are achieved.

[1] An exhaust gas purifying device including a honeycomb catalyst body including a first honeycomb substrate having latticed partition walls defining a plurality of cells extending from a first inflow side end face to a first outflow side end face, and a catalyst loaded onto the first honeycomb substrate, both ends of the cells being opened, respectively; a plugged honeycomb structure including a second honeycomb substrate having latticed partition walls defining a plurality of cells extending from a second inflow side end face to a second outflow side end face, and a plurality of plugging portions arranged to plug open ends of the cells in the second inflow side end face and/or the second outflow side end face in accordance with a predetermined arrangement standard; and a can member formed to receive the honeycomb catalyst body and the plugged honeycomb structure at a downstream position of the honeycomb catalyst body, and including an exhaust gas inflow portion in which an inflow port is disposed at a position to face the first inflow side end face of the honeycomb catalyst body and into which an exhaust gas of a purification target flows, and an exhaust gas emitting portion in which an emission port is disposed at a position to face the second outflow side end face of the plugged honeycomb structure and from which the purified gas is emitted, wherein the plugged honeycomb structure is designed so that a pressure loss of an end face central region in at least one of the second inflow side end face and the second outflow side end face is larger than a pressure loss of an end face circumferential region positioned around the end face central region.

[2] The exhaust gas purifying device according to the above [1], wherein the end face central region includes a region in which the inflow port is vertically projected on the second inflow side end face, and a central region area of the end face central region is set to be equal to an inflow port sectional area in the inflow port of the exhaust gas inflow portion which faces the second inflow side end face via the honeycomb catalyst body or to be larger than the inflow port sectional area.

[3] The exhaust gas purifying device according to the above [1] or [2], wherein open frontal areas of each of the cells in the end face central region and the end face circumferential region are different.

[4] The exhaust gas purifying device according to any one of the above [1] to [3], wherein the plugged honeycomb structure includes at least one prismatic columnar inner honeycomb segment and a plurality of prismatic columnar outer honeycomb segments which surround the inner honeycomb segment, the second inflow side end face and/or the second outflow side end face in the inner honeycomb segment corresponds to the end face central region, and the second inflow side end face and/or the second outflow side end face in each of the outer honeycomb segments corresponds to the end face circumferential region.

[5] The exhaust gas purifying device according to any one of the above [1] to [4], wherein the arrangement standard of the plugging portions is at least one of a structure in which the plugging portions are arranged in the form of a lattice to alternately plug the cells in the second inflow side end face and/or the second outflow side end face and a structure in which the plugging portions are arranged to vary a sectional area of each of the cells in the second inflow side end face and a sectional area of each of the cells in the second outflow side end face, respectively.

[6] The exhaust gas purifying device according to any one of the above [1] to [5], wherein a porosity of the partition walls of the first honeycomb substrate is set to be smaller than a porosity of the partition walls of the second honeycomb substrate.

[7] The exhaust gas purifying device according to any one of the above [1] to [6], wherein a value of a ratio of a length of the honeycomb catalyst body in a central axis direction to a length of the plugged honeycomb structure in the central axis direction is from 0.1 to 0.5.

[8] The exhaust gas purifying device according to any one of the above [1] to [7], wherein a value of a ratio of a length of the honeycomb catalyst body in a central axis direction to a diameter of the honeycomb catalyst body is from 0.1 to 0.6.

[9] The exhaust gas purifying device according to any one of the above [1] to [8], wherein the plugged honeycomb structure has the catalyst loaded onto the second honeycomb substrate, an amount of the catalyst to be loaded per unit volume onto the first honeycomb substrate of the honeycomb catalyst body is from 200 to 400 g/L, and an amount of the catalyst to be loaded per unit volume onto the second honeycomb substrate of the plugged honeycomb structure is from 10 to 120 g/L.

[10] The exhaust gas purifying device according to any one of the above [1] to [9], wherein a partition wall thickness of the first honeycomb substrate is in a range of 50.8 to 101.6 µm.

[11] The exhaust gas purifying device according to any one of the above [1] to [10], wherein a distance between the honeycomb catalyst body and the plugged honeycomb structure is from 1 to 20 mm.

[12] The exhaust gas purifying device according to any one of the above [1] to [11], further including a cylindrical rectifying portion which is disposed between the exhaust gas inflow portion of the can member and the first inflow side end face of the honeycomb catalyst body and in which a plurality of hole portions are made in a circumferential wall, wherein there is adjusted the flow of the exhaust gas taken in from one end of the rectifying portion which faces the inflow port in a direction perpendicular to an axial direction of the honeycomb catalyst body and the plugged honeycomb structure.

According to an exhaust gas purifying device of the present invention, there can be varied pressure losses due to an exhaust gas in an end face central region and/or an end face circumferential region in a second inflow side end face and a second outflow side end face of a second honeycomb substrate disposed in a plugged honeycomb structure, respectively. Further specifically, the pressure loss in the vicinity of the end face central region can be larger than the pressure loss of the end face circumferential region, the exhaust gas can be inhibited from unevenly flowing into an end face central region of a honeycomb catalyst body and the end face central region of the plugged honeycomb structure, and the exhaust gas can uniformly flow through a first inflow side end face and/or a first outflow side end face and the second inflow side end face and/or the second outflow side end face. In consequence, it is possible to efficiently remove a particulate matter included in the exhaust gas and to efficiently purify the exhaust gas.

DESCRIPTION OF THE PREFERRED EMBODIMENTS

Figure 1:
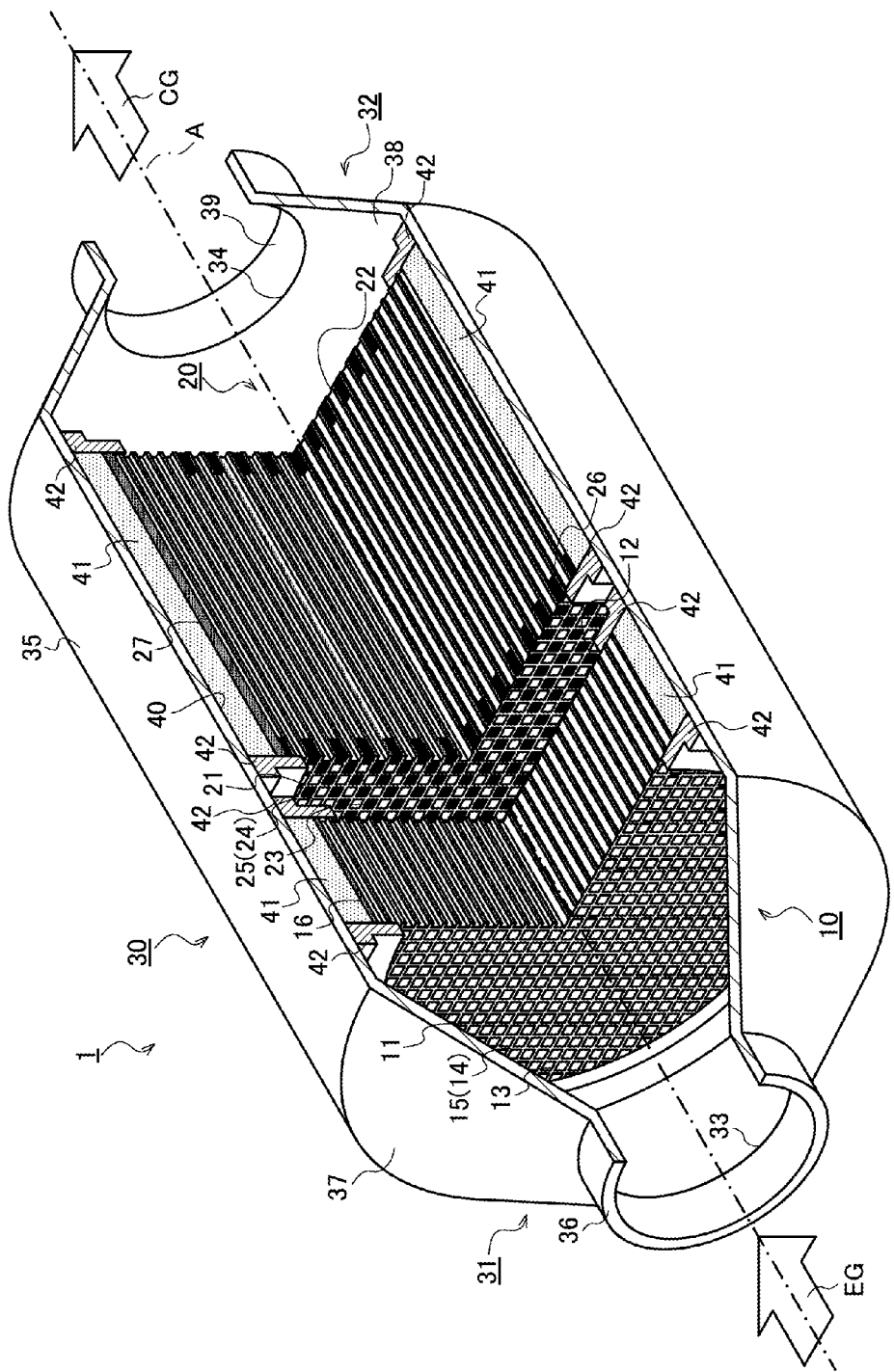
FIG. 1 is a partially cutout perspective view in which a part of an exhaust gas purifying device of the present embodiment is cut out along a central axis thereof.

Hereinafter, an embodiment of an exhaust gas purifying device of the present invention will be described with reference to the drawings. It is to be noted that the exhaust gas purifying device of the present invention is not limited to the following embodiment, and various design changes, modifications, improvements and the like can be added without departing from the gist of the present invention.

[1] Exhaust Gas Purifying Device:

As shown in FIG. 1 to FIG. 5, an exhaust gas purifying device 1 of the present embodiment mainly includes a honeycomb catalyst body 10 including a first honeycomb substrate 15 having latticed partition walls 14 defining a plurality of cells 13 extending from a first inflow side end face 11 to a first outflow side end face 12, and a catalyst loaded onto the first honeycomb substrate 15, both ends of the cells 13 being opened, respectively; a plugged honeycomb structure 20 including a second honeycomb substrate 25 having latticed partition walls 24 defining a plurality of cells 23 extending from a second inflow side end face 21 to a second outflow side end face 22, and a plurality of plugging portions 26 arranged to plug open ends of the cells 23 in the second inflow side end face 21 and/or the second outflow side end face 22 in accordance with a predetermined arrangement standard; and a can member 30 which is made of a metal and formed to receive the honeycomb catalyst body 10 and the plugged honeycomb structure 20, and includes an exhaust gas inflow portion 31 and a purified gas emitting portion 32.

Here, the honeycomb catalyst body 10 is received in the can member 30 so that the first inflow side end face 11 of the first honeycomb substrate 15 faces an inflow port 33 of the exhaust gas inflow portion 31 of the can member 30, whereas the plugged honeycomb structure 20 is received in the can member 30 so that the second outflow side end face 22 faces an emitting port 34 of the purified gas emitting portion 32 of the can member 30. That is, the honeycomb catalyst body 10 is positioned on an upstream side in the can member 30, and the plugged honeycomb structure 20 is positioned at a position on a downstream side of the honeycomb catalyst body (see FIG. 1 and FIG. 2). At this time, the honeycomb catalyst body 10 and the plugged honeycomb structure 20 received in the can member 30 are positioned so that the first outflow side end face 12 of the honeycomb catalyst body 10 (the first honeycomb substrate 15) faces the second inflow side end face 21 of the plugged honeycomb structure 20 (the second honeycomb substrate 25), and furthermore, a predetermined clearance (a distance W) is disposed between the first outflow side end face 12 and the second inflow side end face 21. It is to be noted that the distance W between the first outflow side end face 12 and the second inflow side end face 21 is set to a range of 1 to 20 mm in the present embodiment.

Here, the can member 30 is mainly made of a metal material, and constituted to have a structure and an inner diameter in which the round pillar-shaped honeycomb catalyst body 10 and plugged honeycomb structure 20 can be received and stored, respectively, and the can member includes a cylindrical can member the main body 35 having an inner diameter D3 which is larger than a diameter D1 of the honeycomb catalyst body 10 and a diameter D2 of the plugged honeycomb structure 20, and the exhaust gas inflow portion 31 and the purified gas emitting portion 32 which are attached to both ends of the can member main body 35, respectively.

The exhaust gas inflow portion 31 is connected to an exhaust gas emitting section (not shown) of a direct injection type gasoline engine to introduce an exhaust gas EG to the exhaust gas purifying device 1, and the exhaust gas inflow portion includes an introduction pipe 36 constituted of a cylindrical member having a diameter which is smaller than that of the can member main body 35, and a truncated conical diameter expanding portion 37 having a diameter which increases from the inflow port 33 at one end of the introduction pipe 36 to the can member main body 35. On the other hand, the purified gas emitting portion 32 emits, to the outside, a purified gas CG which is cleaned while passing through the plugged honeycomb structure 20, and the purified gas emitting portion includes a truncated conical diameter reducing portion 38 having a diameter which decreases from the other end of the can member main body 35, and a small-diameter cylindrical emission tube 39 connected to the emitting port 34 at one end of the diameter reducing portion 38 to emit the purified gas CG to the outside.

Here, the introduction pipe 36 and the emission tube 39 have the same shape, and the diameter expanding portion 37 and the diameter reducing portion 38 have the same shape. In the exhaust gas purifying device 1 of the present embodiment, the honeycomb catalyst body 10 is disposed at the upstream position of the plugged honeycomb structure 20 in the can member 30, so that the inflow port 33 of the exhaust gas inflow portion 31 can face the first inflow side end face 11 of the honeycomb catalyst body 10. As a result, a temperature of the honeycomb catalyst body 10 can be raised by utilizing the heat of the high-temperature exhaust gas EG sent from the direct injection type gasoline engine, and the temperature can reach a temperature at which the loaded catalyst indicates a high activity, in a short time. In consequence, a purifying treatment of the exhaust gas EG can efficiently be performed by utilizing the high catalytic activity immediately after the start of the engine.

As described above, the inner diameter D3 of the cylindrical can member the main body 35 of the can member 30 is designed to be larger than each of the diameters D1 and D2 of the honeycomb catalyst body 10 and the plugged honeycomb structure 20. Therefore, in a case where the honeycomb catalyst body 10 and the like are received as they are in the can member 30, a clearance is generated between an inner circumferential wall surface 40 of the can member main body 35 and each of an outer circumferential wall surface 16 of the honeycomb catalyst body 10 and an outer circumferential wall surface 27 of the plugged honeycomb structure 20, the honeycomb catalyst body 10 and the like are movable in the can member 30, and hence a stored state is not stable. To eliminate such a problem, a cushion material 41 made of a shock-absorbing material is interposed between the outer circumferential wall surface 16 or the like of the honeycomb catalyst body 10 or the like and the inner circumferential wall surface 40 of the can member main body 35. In consequence, the above clearance is filled with the cushion material 41, so that the movement of the honeycomb catalyst body 10 or the like in the can member main body 35 can be regulated and the stored state can be stabilized.

Furthermore, to regulate the movement of the honeycomb catalyst body 10 and the plugged honeycomb structure 20 in a forward-backward direction (corresponding to a right-left direction of paper surface in FIG. 2) in the can member 30, a pair of stopper members 42 having an L-shaped cross section are attached along the inner circumferential wall surface 40. The movement of the honeycomb catalyst body 10 or the like in the forward-backward direction in the can member 30 is regulated by the pair of stopper members 42 which are fixed to abut on the first inflow side end face 11 and the first outflow side end face 12 of the honeycomb catalyst body 10 and the second inflow side end face 21 and the second outflow side end face 22 of the plugged honeycomb structure 20, respectively, and to sandwich the honeycomb catalyst body 10 and the plugged honeycomb structure 20 between the stopper members.

By the cushion material 41 and the stopper members 42, the honeycomb catalyst body 10 and the plugged honeycomb structure 20 can stably be stored in the can member main body 35. Furthermore, even in a case where shock is given to the can member 30, the shock can be absorbed by the cushion material 41 and the like, and possibilities that cracks, chips and the like are generated in the honeycomb catalyst body 10 and the like can be decreased.

Figure 2:
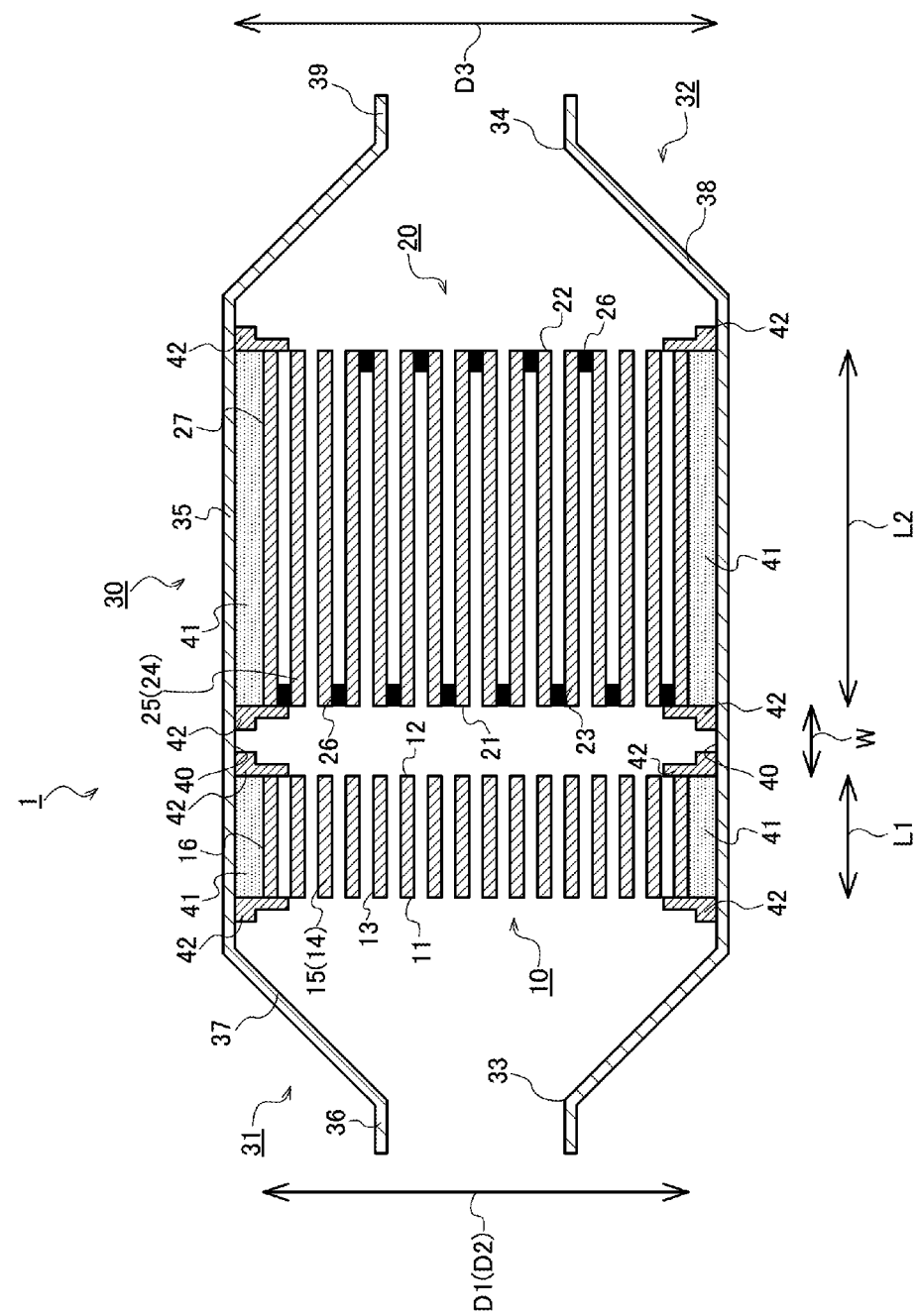
FIG. 2 is an explanatory view schematically showing a cross section of the exhaust gas purifying device which is parallel to the central axis.
Figure 3:
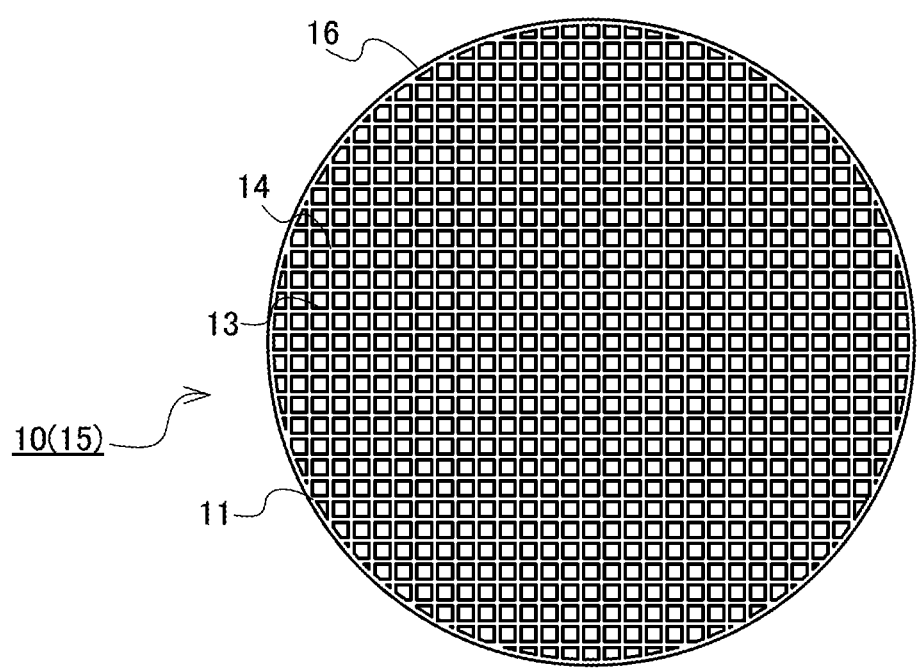
FIG. 3 is an explanatory view schematically showing a first inflow side end face of a honeycomb catalyst body.

As shown in FIGS. 1 to 3, the honeycomb catalyst body 10 for use in the exhaust gas purifying device 1 of the present embodiment possesses a round pillar-shaped structure, and has the quadrangularly latticed partition walls 14 defining the plurality of cells 13 extending from the first inflow side end face 11 to the first outflow side end face 12. On the other hand, as shown in FIGS. 1 and 2 and FIGS. 4 and 5, the plugged honeycomb structure 20 for use in the exhaust gas purifying device 1 possesses a round pillar-shaped structure, has the quadrangularly latticed partition walls 24 defining the plurality of cells 23 extending from the second inflow side end face 21 to the second outflow side end face 22, and is designed so that a pressure loss of an end face central region C (corresponding to the inside of a broken-line circle of each of FIG. 4 and FIG. 5) in the second inflow side end face 21 and the second outflow side end face 22 becomes larger than a pressure loss of an end face circumferential region O (corresponding to the outside of the broken-line circle of each of FIG. 4 and FIG. 5) positioned around the end face central region C.

Figure 4:
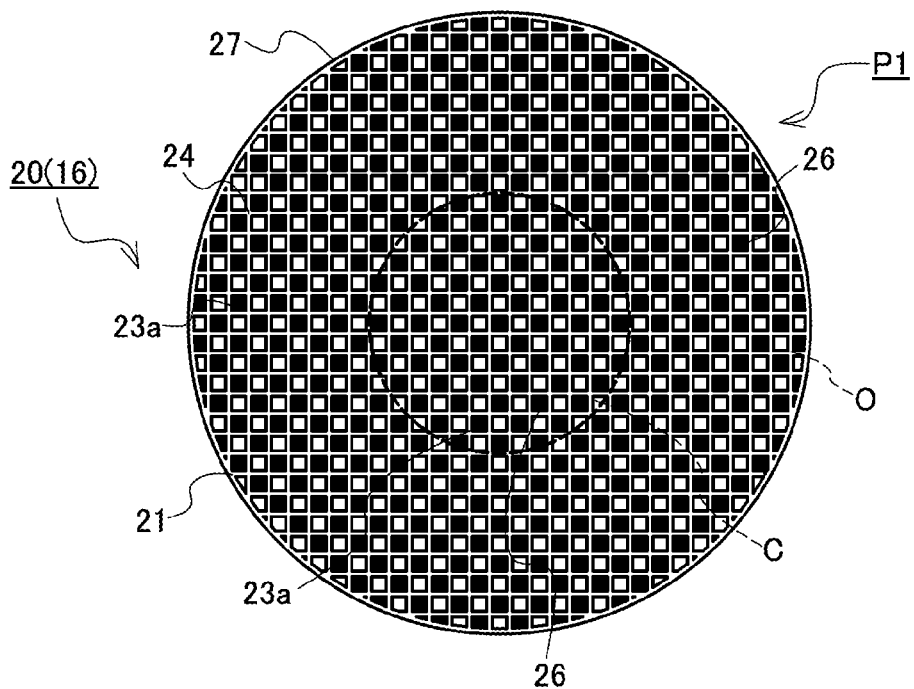
FIG. 4 is an explanatory view schematically showing a second inflow side end face of a plugged honeycomb structure.
Figure 5:
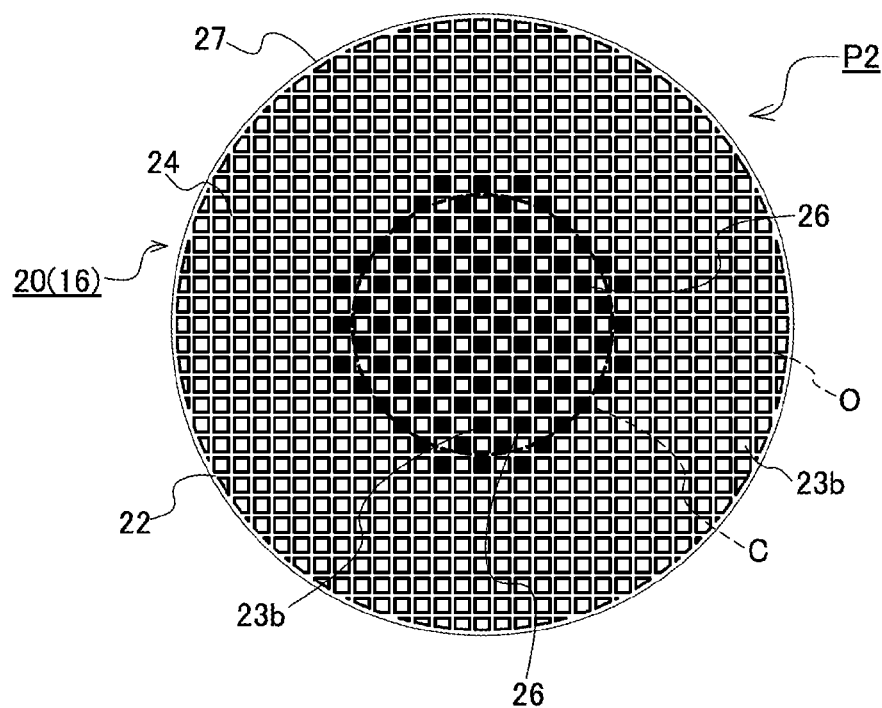
FIG. 5 is an explanatory view schematically showing a second outflow side end face of the plugged honeycomb structure.

In the end face central region C, the plugging portions 26 to plug open ends of predetermined cells 23a opened in the second inflow side end face 21 and open ends of the residual cells 23b of the second outflow side end face 22, respectively, are arranged regularly in accordance with a predetermined arrangement standard (see FIG. 4, FIG. 5, etc.). In the present embodiment, the predetermined cells 23a of the end face central region C are alternately plugged, and further in a lower stage, the cells are shifted one by one and alternately plugged, whereby the plurality of plugging portions 26 are arranged in the form of a lattice to possess a checkerboard pattern.

On the other hand, in the second inflow side end face 21 of the end face circumferential region O, the cells are alternately plugged and in a lower stage, the cells are shifted one by one and alternately plugged, whereby the plurality of plugging portions 26 are arranged in the form of the lattice in the same manner as in the end face central region C of the second inflow side end face 21 (see FIG. 4). On the other hand, in the second outflow side end face 22 of the end face circumferential region O, any plugging portions 26 are not arranged (see FIG. 5). That is, all the cells 23b in the second outflow side end face 22 of the end face circumferential region O are opened. That is, the plugging portions 26 are arranged in the second inflow side end face 21 and the second outflow side end face 22 of the end face central region C, whereas the plugging portions 26 are arranged only in the second inflow side end face 21 of the end face circumferential region O.

Consequently, the pressure loss of the end face circumferential region O is smaller than that of the end face central region C, and the exhaust gas EG easily flows into the end face circumferential region. In this way, the arrangement standard of the plugging portions 26 is changed between the second inflow side end face 21 and the second outflow side end face 22, thereby differentiating open frontal areas of the cells 23 in the end face central region C and the end face circumferential region O, and the flow of the exhaust gas EG can optionally be controlled, so that the exhaust gas EG can be inhibited from unevenly flowing only in the end face central region C. In addition to changing the arrangement standard of the plugging portions 26 as described above, open frontal areas of each cells 23 in the end face central region C and the end face circumferential region O may be differentiated by employing HAC structure (details are described later) on open shapes of cells for example. Thereby a difference in pressure loss is made between the end face central region C and the end face circumferential region O.

Here, the end face central region C includes at least a region in which the inflow port 33 of the can member 30 is vertically projected as it is on the second inflow side end face 21 (or the second outflow side end face 22), and a central region area (corresponding to an area in the broken-line circle of each of FIG. 4 and FIG. 5) of the end face central region C is set to a size equal to an inflow port sectional area in the inflow port 33 of the exhaust gas inflow portion 31 which faces the second inflow side end face 21 via the honeycomb catalyst body 10, or larger than the inflow port sectional area.

The exhaust gas EG flowing from the exhaust gas inflow portion 31 into the can member 30 generally indicates straight advancing properties. Therefore, in a conventional exhaust gas purifying device, the exhaust gas EG reaching the diameter expanding portion 37 from the inflow port 33 advances as it is a bore of the inflow port 33, and is to straightly reach the first inflow side end face 11 of the honeycomb catalyst body 10 without enlarging in an upward-downward direction (corresponding to the upward-downward direction of the paper surface in FIG. 2) and the right-left direction (corresponding to a proximal-distal direction of the paper surface in FIG. 2).

Afterward, the exhaust gas EG which has received a catalyst active reaction by the honeycomb catalyst body 10 reaches the second inflow side end face 21 of the plugged honeycomb structure 20 through the above-mentioned clearance (the distance W) from the first outflow side end face 12. Also at this time, the exhaust gas EG indicates the straight advancing properties while flowing, and hence a large amount of exhaust gas EG is to flow into the second inflow side end face 21 in the vicinity of the end face central region C of the plugged honeycomb structure 20.

However, in the exhaust gas purifying device 1 of the present embodiment, the pressure loss of the end face central region C of the plugged honeycomb structure 20 is adjusted to be larger than that of the end face circumferential region O, so that the flow of the exhaust gas EG which is to advance straightly from the inflow port 33 can be regulated to direct a part of the exhaust gas EG toward the end face circumferential region O around the end face central region C. That is, in a case where a difference in pressure loss is made between the end face central region C and the end face circumferential region O in the can member 30, the exhaust gas EG flows toward the end face circumferential region O in which the pressure loss is small.

Furthermore, such a difference in pressure loss also has an influence on a flow direction of the exhaust gas EG passing through the honeycomb catalyst body 10 positioned on the upstream side of the plugged honeycomb structure 20. Therefore, also in the exhaust gas EG from the inflow port 33 toward the first inflow side end face 11 of the honeycomb catalyst body 10, there can be generated flow of the exhaust gas EG from an end face central region (not shown) of the first inflow side end face 11 toward an end face circumferential region (not shown) thereof. Therefore, unevenness of the flow due to deposition of a particulate matter in the plugged honeycomb structure 20 can be inhibited, and the catalyst active reaction can uniformly be generated over the whole surface of the honeycomb catalyst body 10. That is, an effective cross section of the honeycomb catalyst body 10 which effectively exerts a catalytic action can efficiently be used, and the exhaust gas EG does not unevenly flow through the end face central region of the honeycomb catalyst body 10.

There is not any special restriction on a material constituting the plugging portions 26 to be arranged in the plugged honeycomb structure 20, but the material can be made of a plugging material in which a ceramic raw material, alcohol, an organic binder and the like are combined, and it is preferable that the ceramic raw material is the same or the same type as a ceramic raw material of the first honeycomb substrate 15 or the second honeycomb substrate 25 which will be described later. Consequently, a behavior at a high temperature during firing can be identical, and the partition walls 24 and the plugging portions 26 can firmly be bonded without overloading each space between the partition walls 24 and the plugging portions 26 due to thermal expansion or thermal contraction.

[2] Honeycomb Catalyst Body:

As shown in FIG. 1 to FIG. 3, the honeycomb catalyst body 10 for use in the exhaust gas purifying device 1 of the present embodiment includes the first honeycomb substrate 15 which possesses a round pillar-shaped structure and has the latticed partition walls 14 made of a porous material and defining the plurality of cells 13 extending from the first inflow side end face 11 to the first outflow side end face 12, and both ends of each cell 13 are not closed with the plurality of plugging portions 26 as in the plugged honeycomb structure 20, i.e., one of the end faces 11 and 12 of the cell is opened. Here, a value of a ratio (=L1/D1) of a length L1 of the honeycomb catalyst body 10 in a central axis direction (see a one-dot chain line A in FIG. 1) to a diameter D1 of the honeycomb catalyst body 10 is set to a range of 0.1 to 0.6. This ratio is further preferably in a range of 0.15 to 0.35 and especially preferably in a range of 0.2 to 0.3.

In a case where the above value of the ratio of the length is smaller than 0.1, time for which the exhaust gas EG is retained in the first honeycomb substrate 15 shortens, and there is the fear that the temperature of the honeycomb catalyst body 10 is not sufficiently raised by the heat of the exhaust gas EG and that a purifying performance immediately after the start of the engine does not sufficiently exert its effect. On the other hand, in a case where such a ratio is in excess of 0.6, a weight of the honeycomb catalyst body 10 increases. That is, there is the fear that a density excessively increases, more time is required until the catalyst of the honeycomb catalyst body 10 reaches a temperature to be sufficiently activated by the heat of the exhaust gas EG, and the purifying performance of the exhaust gas EG is not sufficiently exerted. Therefore, it is determined that such a value of the ratio is in the above range.

Furthermore, in a relation between the honeycomb catalyst body 10 and the plugged honeycomb structure 20, a porosity of the partition walls 14 of the first honeycomb substrate 15 of the honeycomb catalyst body 10 is set to be smaller than a porosity of the partition walls 24 of the second honeycomb substrate 25 of the plugged honeycomb structure 20. Furthermore, a value of a ratio (=L1/L2) of the length L1 of the honeycomb catalyst body 10 in the central axis direction to a length L2 of the plugged honeycomb structure 20 in the central axis direction (along the one-dot chain line A) is set to a range of 0.1 to 0.5.

In the cells 13 of the honeycomb catalyst body 10, there are acquired through channels which extend from the first inflow side end face 11 to the first outflow side end face 12 and through which the exhaust gas EG flows, and the cells 13 are not closed by the plugging portions 26 as in the plugged honeycomb structure 20. Therefore, even in a case where a comparatively large amount of catalyst is loaded onto the partition walls 14 of the honeycomb catalyst body 10, decrease of the pressure loss is not caused in the whole honeycomb catalyst body 10.

For example, an amount of the catalyst to be loaded per unit volume onto the partition walls 14 of the honeycomb catalyst body 10 can be adjusted in a range of 200 to 400 g/L. It is to be noted that the catalyst may be loaded or does not have to be loaded onto the partition walls 24 of the plugged honeycomb structure 20. At this time, it is necessary to adjust the amount of the catalyst to be loaded onto the partition walls 24 of the plugged honeycomb structure 20 in a range of 10 to 120 g/L so that the amount is smaller than the amount of the catalyst to be loaded per unit volume onto the partition walls 14 of the honeycomb catalyst body 10. The amount of the catalyst to be loaded is suppressed to such a degree, so that influences of the pressure loss due to the catalyst in the plugged honeycomb structure 20 can be decreased.

Furthermore, the amount of the catalyst to be loaded per unit volume onto the honeycomb catalyst body 10 is preferably set to a range of 200 to 400 g/L, further preferably set to a range of 200 to 300 g/L, and especially preferably set to a range of 200 to 250 g/L as described above. Here, when the amount of the catalyst to be loaded is smaller than 200 g/L, the amount of the catalyst to be loaded onto the partition walls 14 runs short, and hence there is the possibility that generation of a quantity of the heat which is caused by the catalyst active reaction is inhibited and that more time is required to raise the temperature of the honeycomb catalyst body to the temperature at which the catalyst indicates the activity. Therefore, it becomes difficult to efficiently purify the exhaust gas EG immediately after the start of the engine. On the other hand, in a case where the amount of the loaded catalyst is in excess of 400 g/L, there is the fear that the through channels of the cells 13 become narrower, and there is the fear that the pressure loss heightens in the whole honeycomb catalyst body 10. To eliminate such a problem, the amount of the catalyst to be loaded is adjusted in the above range.

FIG. 3 is a plan view showing the first inflow side end face 11 of the honeycomb catalyst body 10 for use in the exhaust gas purifying device 1. It is to be noted that an appearance shape of the honeycomb catalyst body 10 is not limited to the above round pillar shape, and the shape may be, for example, an elliptic pillar shape, a quadrangular pillar shape or the like. Furthermore, there is not any special restriction on a size of the honeycomb catalyst body 10 and, for example, the length L1 of the honeycomb catalyst body in the central axis direction is from 30 to 200 mm.

A partition wall thickness of the partition walls 14 of the first honeycomb substrate 15 of the honeycomb catalyst body 10 is preferably in a range of 50.8 to 101.6 µm, further preferably in a range of 50.8 to 75 µm, and especially preferably in a range of 65 to 75 µm. When the thickness is smaller than 50.8 µm, there is the fear that strength of the honeycomb catalyst body 10 deteriorates. On the other hand, in a case where the thickness is in excess of 101.6 µm, there is a high possibility that the pressure loss increases when the exhaust gas EG passes through the cells 13. It is to be noted that the partition wall thickness is a value measured by microscopy of a cross section of the honeycomb catalyst body which is parallel to the central axis direction.

The porosity of the partition walls 14 of the first honeycomb substrate 15 of the honeycomb catalyst body 10 is set to be smaller than the porosity of the partition walls 24 of the second honeycomb substrate 25 of the plugged honeycomb structure 20. Consequently, the strength of the honeycomb catalyst body 10 can be secured. In a case where an open frontal area in the first inflow side end face 11 of the honeycomb catalyst body 10 is larger than an open frontal area in the second inflow side end face 21 of the plugged honeycomb structure 20, a heat capacity of the honeycomb catalyst body 10 becomes smaller than a heat capacity of the plugged honeycomb structure 20, and hence a temperature rising rate of the honeycomb catalyst body 10 is faster than that of the plugged honeycomb structure 20. However, there is the fear that hardness of the honeycomb catalyst body 10 is not sufficiently acquired.

To eliminate such a problem, the porosity of the partition walls 14 is preferably adjusted to be smaller than the porosity of the partition walls 24. Furthermore, the temperature of the honeycomb catalyst body 10 is rapidly raised, and hence the temperature of the honeycomb catalyst body 10 can be raised by utilizing the heat of the exhaust gas EG. Consequently, the temperature of the plugged honeycomb structure 20 can rapidly be raised.

There is not any special restriction on the porosity of the partition walls 14, but, for example, the porosity is preferably in a range of 20 to 50%, further preferably in a range of 25 to 38%, and especially preferably in a range of 25 to 30%. In a case where the porosity is smaller than 20%, there is the fear that the pressure loss increases, and in a case where the porosity is in excess of 50%, the honeycomb catalyst body 10 becomes brittle and easily falls. It is to be noted that the porosity of the partition walls 14 is a value measured by a mercury porosimeter.

In the partition walls 14 of the above porosity, an average pore diameter of the partition walls 14 is preferably in a range of 5 to 30 µm and further preferably in a range of 10 to 25 µm. When the average pore diameter of the partition walls 14 is smaller than 5 µm, close contact properties between the catalyst and the surfaces of the partition walls 14 cannot sufficiently be obtained, and there is the fear that a catalyst layer peels. On the other hand, when the average pore diameter is in excess of 30 µm, the honeycomb catalyst body 10 becomes brittle and easily falls. The average pore diameter of the partition walls 14 is a value measured by the mercury porosimeter in the same manner as in the porosity.

The first honeycomb substrate 15 constituting the honeycomb catalyst body 10 includes ceramic as a main component. An example of a material of the partition walls 14 is preferably at least one selected from the group consisting of silicon carbide, a silicon-silicon carbide based composite material, cordierite, mullite, alumina, spinel, a silicon carbide-cordierite based composite material, lithium aluminum silicate and aluminum titanate. Among these materials, cordierite, which has a small thermal expansion coefficient and is excellent in thermal shock resistance, is especially preferably used to constitute the first honeycomb substrate 15.

Additionally, the honeycomb catalyst body may have a circumferential wall in its outermost circumference. The circumferential wall is especially preferably a formed monolithic wall which is formed integrally with a porous substrate during formation, but the circumferential wall may be constructed by using a ceramic cement material or the like after grinding a circumference of the porous substrate. It is to be noted that in the formed monolithic wall, the circumferential wall is preferably made of the same material as in the honeycomb catalyst body 10. On the other hand, in the case that the circumferential wall is constructed by using the ceramic cement material, there may be used a material obtained by adding a flux component of glass or the like to a common base material.

As the catalyst to be loaded onto the first honeycomb substrate 15, for example, "a three-way catalyst" is usable. The three-way catalyst is a catalyst to mainly purify hydrocarbons (HC), carbon monoxide (CO) and nitrogen oxides ($NO_x$), and the three-way catalyst may include, for example, platinum (Pt), palladium (Pd) and rhodium (Rh). By the three-way catalyst, hydrocarbons are purified into water and carbon dioxide, carbon monoxide is purified into carbon dioxide, and nitrogen oxides are purified into nitrogen, respectively, by oxidation or reduction reaction.

[3] Plugged Honeycomb Structure:

FIG. 4 and FIG. 5 are plan views showing the second inflow side end face 21 (FIG. 4) and the second outflow side end face 22 (FIG. 5) of the plugged honeycomb structure 20 for use in the exhaust gas purifying device 1. In the present embodiment, the plugged honeycomb structure 20 possesses a round pillar-shaped structure. An example of a size of the plugged honeycomb structure 20 is the length L2 of 50 to 200 mm in the central axis direction. Furthermore, the diameter D2 of the plugged honeycomb structure 20 is preferably from 80 to 180 mm.

A partition wall thickness of the partition walls 24 of the second honeycomb substrate 25 of the plugged honeycomb structure 20 is preferably in a range of 127 to 508 µm, further preferably in a range of 250 to 400 µm, and especially preferably in a range of 250 to 350 µm. When the thickness is smaller than 127 µm, there is the fear that strength of the plugged honeycomb structure 20 deteriorates. On the other hand, when the thickness is in excess of 508 µm, there is a high possibility that the pressure loss increases when the exhaust gas EG passes through the cells 23. It is to be noted that the partition wall thickness is a value measured by microscopy of a cross section of the plugged honeycomb structure which is parallel to the central axis direction.

There is not any special restriction on the porosity of the partition walls 24 of the second honeycomb substrate 25, but, for example, the porosity is preferably in a range of 35 to 80%, further preferably in a range of 38 to 65%, and especially preferably in a range of 45 to 65%. In a case where the porosity is smaller than 35%, there is the fear that the pressure loss increases, and in a case where the porosity is in excess of 80%, the plugged honeycomb structurebecomes brittle and easily falls. It is to be noted that the porosity of the partition walls 24 is a value measured by the mercury porosimeter. In the above range, the porosity of the partition walls 14 is set to be smaller than that of the partition walls 24 as described above. In the partition walls 24 of the above porosity, an average pore diameter of the partition walls 24 is preferably in a range of 7 to 40 µm and further preferably in a range of 8 to 35 µm. When the average pore diameter of the partition walls 24 is smaller than 7 µm, there is the fear that the pressure loss increases even in a case where less particulate matter is deposited. On the other hand, when the average pore diameter is in excess of 40 µm, the plugged honeycomb structure 20 becomes brittle and easily falls, and there is a high possibility that a trapping performance of the particulate matter deteriorates. The average pore diameter of the partition walls 24 is a value measured by the mercury porosimeter in the same manner as in the porosity.

A value of a ratio (=L2/D2) of the length L2 of the second honeycomb substrate 25 in the central axis direction to the diameter D2 of the second inflow side end face 21 is preferably in a range of 0.5 to 1.5, further preferably in a range of 0.8 to 1.5 and especially preferably in a range of 1.1 to 1.3. Here, when such a ratio is smaller than 0.5, the length of the second honeycomb substrate 25 in the central axis direction excessively shortens. Consequently, there is the fear that a filterable area decreases, a trapping efficiency of the particulate matter and the like included in the exhaust gas EG deteriorates, and the pressure loss increases. On the other hand, when the value of the ratio is in excess of 1.5, the length L2 of the second honeycomb substrate 25 in the central axis direction is excessively long. Consequently, there is the fear that the pressure loss in the cells 23 increases and that the pressure loss of the whole plugged honeycomb structure 20 excessively increases.

The second honeycomb substrate 25 includes a ceramic material as a main component, and a material similar to the above-mentioned material of the first honeycomb substrate 15 is usable. Furthermore, similarly to the honeycomb catalyst body 10, the plugged honeycomb structure 20 may have a circumferential wall in its outermost circumference. Furthermore, an example of the catalyst to be loaded onto the partition walls 24 of the second honeycomb substrate 25 is "the three-way catalyst" used in the same manner as in the first honeycomb substrate 15.

[4] Arrangement Standard (Pattern) of Plugging Portions:

As the arrangement standard of the plugging portions 26 to plug the cells 23 of the second inflow side end face 21 and/or the second outflow side end face 22 of the plugged honeycomb structure 20 in the exhaust gas purifying device 1 of the present embodiment, as illustrated in FIG. 4 and FIG. 5, the plugging portions 26 are arranged in the form of a lattice over the whole surface of the second inflow side end face 21 as in a so-called "checkerboard pattern" (a first pattern P1), whereas the plugging portions 26 are arranged limitedly to the end face central region C of the second outflow side end face 22 in accordance with the similar arrangement standard (a second pattern P2). However, in the exhaust gas purifying device 1 of the present invention, there is not any special restriction on the arrangement standard of the plugging portions 26, as long as a difference can be made in pressure loss between the end face central region C and the end face circumferential region O and the pressure loss of the end face central region C into which the exhaust gas EG easily flows is larger than that of the end face circumferential region O.

For example, the plugging portions may be arranged limitedly to the end face central region C of each of the second inflow side end face 21 and the second outflow side end face 22 in the form of the lattice in accordance with the arrangement standard of the checkerboard pattern, or the first pattern P1 and the second pattern P2 of the plugging portions 26 of the second inflow side end face 21 and the second outflow side end face 22 in the above-mentioned present embodiment may be reversed. In any case, the pressure loss of the end face central region C can be adjusted to be larger than the pressure loss of the end face circumferential region O. As a result, the exhaust gas EG does not unevenly flow through the end face central region C of the plugged honeycomb structure 20, but the exhaust gas EG can uniformly flow through the whole second inflow side end face 21 and/or second outflow side end face 22. Furthermore, the flow of the exhaust gas EG in the honeycomb catalyst body 10 disposed at the upstream position of the plugged honeycomb structure 20 can be controlled, and in the same manner as in the plugged honeycomb structure 20, the exhaust gas EG can be inhibited from unevenly flowing through the end face central region C.

Furthermore, FIGS. 6 to 9 show example constitutions of the arrangement standard of the plugging portions 26 except the first pattern P1 and the second pattern P1 mentioned above. It is to be noted that for simplification of drawing, FIGS. 6 to 9 schematically show the cells 23 arranged in the second inflow side end face 21 and the plugging portions 26 by which the cells 23 are plugged. Here, a paper surface left side of each of FIGS. 6 to 9 shows an end face central region C side on which the pressure loss is large, and a paper surface right side shows an end face circumferential region O side on which the pressure loss is small. Furthermore, each of FIGS. 6 to 9 shows a region boundary line M constituted of a broken line in the vicinity of a middle, to show an approximate boundary between the region C and the region O. FIGS. 6 to 9 show hatched regions in black as the plugging portions 26 by which the cells 23 are plugged.

Figure 6:
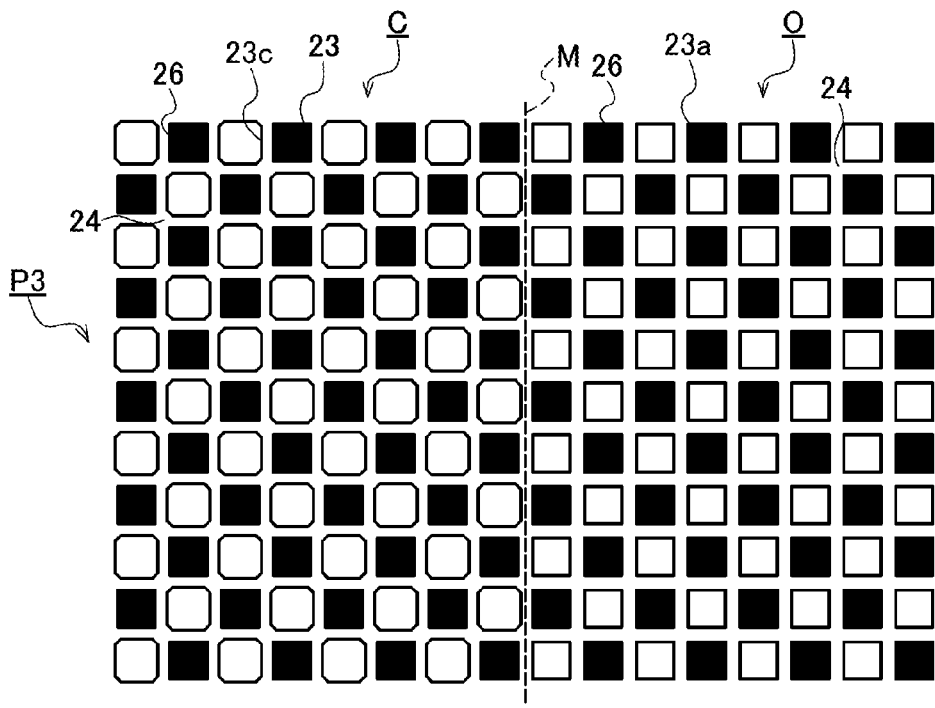
FIG. 6 is an explanatory view schematically showing another example constitution of an arrangement standard of plugging portions of the plugged honeycomb structure.

In a third pattern P3 shown in FIG. 6, a structure in which sectional shapes of cells 23c are different between a second inflow side end face 21 and a second outflow side end face 22 (a high ash capacity structure (HAC structure)) is employed in an end face central region C, and plugging portions 26 are arranged in the form of a lattice of the above-mentioned checkerboard pattern in an end face circumferential region O. Here, each of the cells 23c of the HAC structure is formed into an octagonal sectional shape by cutting four corners of a quadrangular cell. At this time, in a case where the plugging portions 26 are arranged to cells 23 of the second inflow side end face 21, the plugging portions 26 are arranged to the residual cells (not shown) of the second outflow side end face 22 which have the octagonal sectional shape. As a result, in the end face central region C plugged in accordance with an arrangement standard in which the HAC structure is employed, each octagonal cell having an area to be plugged which is larger than that of each quadrangular cell is plugged in the second outflow side end face 22, open frontal areas of each of the cells are different, and hence the pressure loss increases as compared with the end face circumferential region O. Therefore, it is possible to guide an exhaust gas EG toward the end face circumferential region O due to a pressure loss difference. Furthermore, flow of the exhaust gas EG in a honeycomb catalyst body 10 disposed at an upstream position of a plugged honeycomb structure can be controlled, and the exhaust gas can be guided toward the end face circumferential region.

Figure 7:
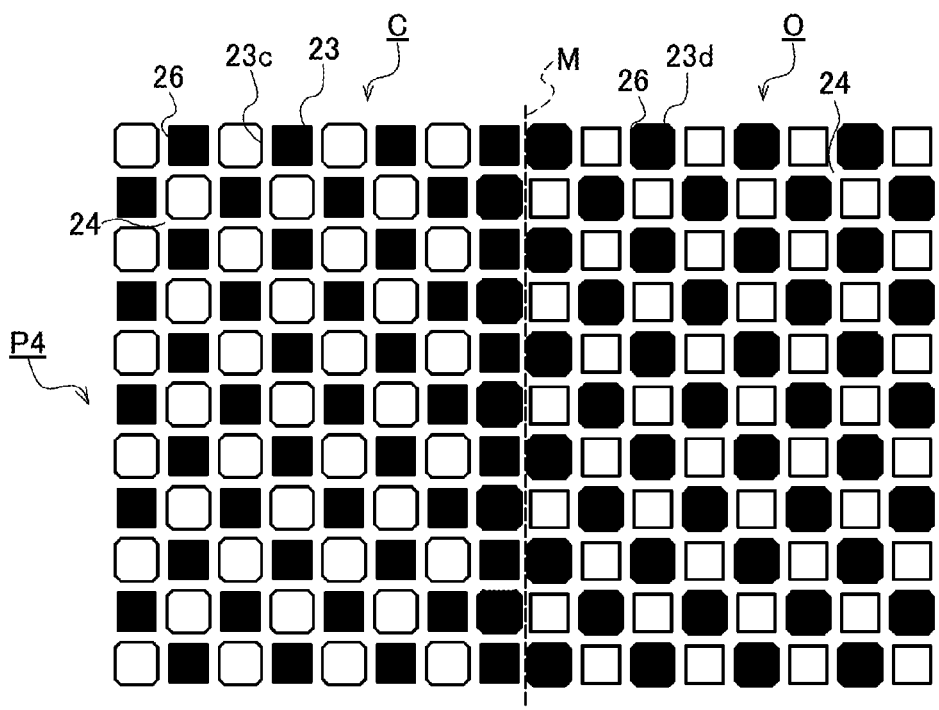
FIG. 7 is an explanatory view schematically showing still another example constitution of the arrangement standard of the plugging portions of the plugged honeycomb structure.
Figure 8:
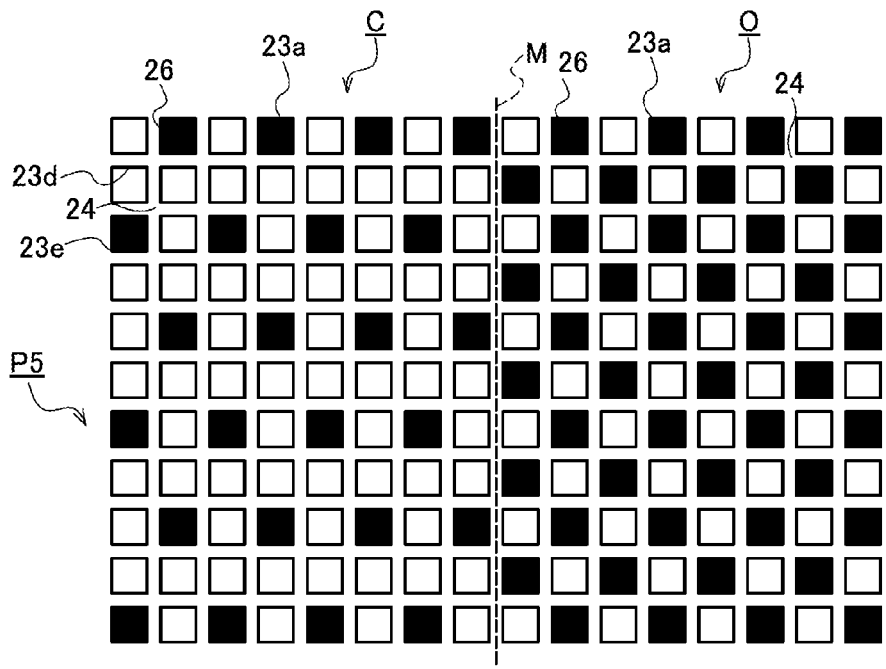
FIG. 8 is an explanatory view schematically showing a further example constitution of the arrangement standard of the plugging portions of the plugged honeycomb structure.
Figure 9:
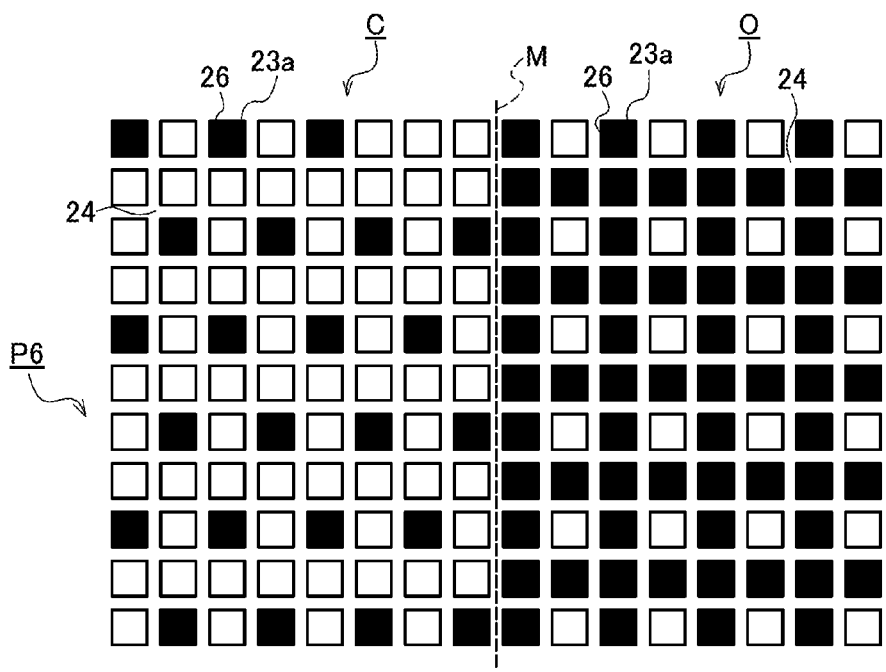
FIG. 9 is an explanatory view schematically showing a further example constitution of the arrangement standard of the plugging portions of the plugged honeycomb structure.

In a fourth pattern P4 shown in FIG. 7, a HAC structure similar to FIG. 6 is employed in an end face central region C, and furthermore, in an end face circumferential region O, the HAC structure is reversed and this reversed HAC structure is employed in which cells 23d having an octagonal sectional shape are plugged. A fifth pattern P5 shown in FIG. 8 is different from the patterns of FIG. 6 and FIG. 7, and in an end face central region C, a plugging portion 26 is not disposed to a cell 23d positioned in a lower stage of a cell 23a to which the plugging portion 26 is disposed, and further in a lower stage, the plugging portions 26 are shifted one by one and alternately arranged in cells 23e positioned in the lower stage. On the other hand, in an end face circumferential region O, the plugging portions 26 are arranged in the form of the lattice of the above-mentioned checkerboard pattern. In a sixth pattern P6 shown in FIG. 9, the fifth pattern P5 similar to that of the end face central region C of FIG. 8 is employed in an end face central region C, and further in an end face circumferential region O, a pattern of a reverse structure to that of the end face central region C of FIG. 8 is employed.

These constitutions can optionally be set in the second inflow side end face 21 and the second outflow side end face 22, respectively.

Figure 10:
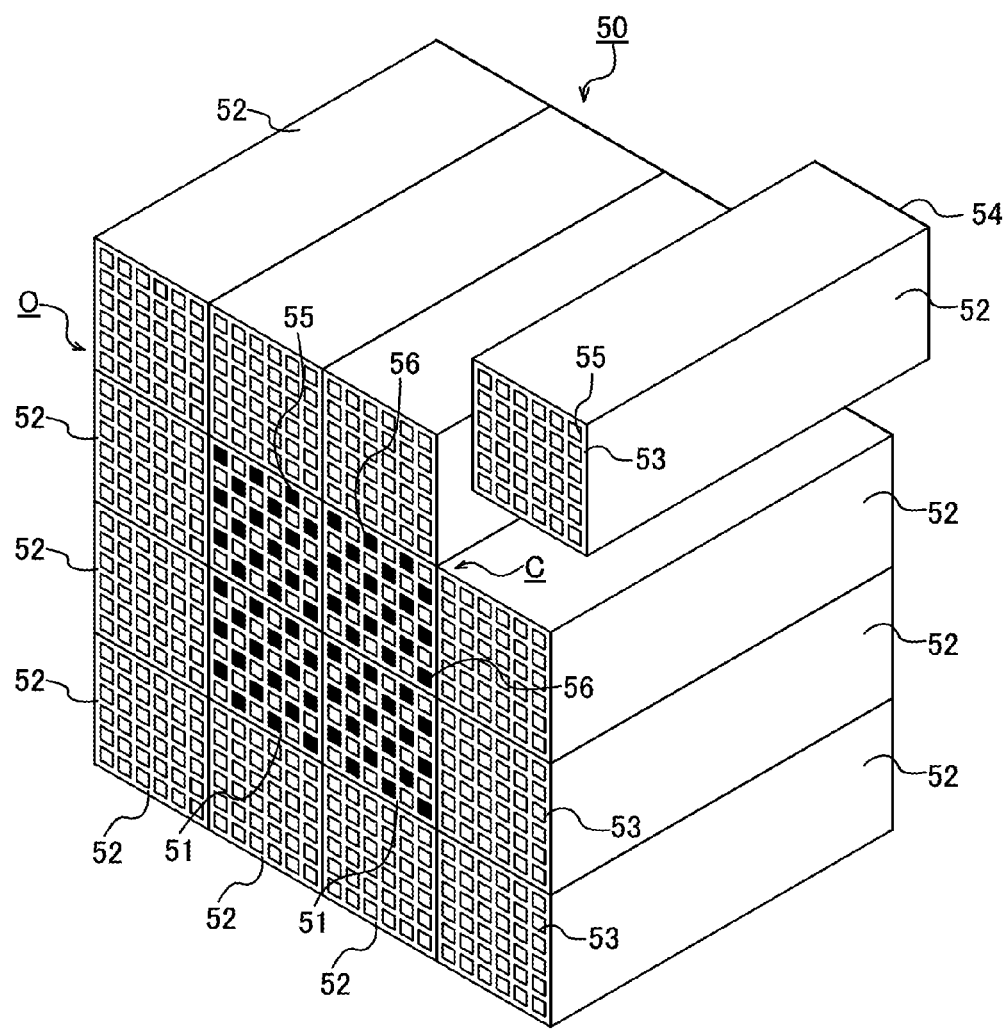
FIG. 10 is a perspective view schematically showing a still further example constitution of the plugged honeycomb structure.

Furthermore, as another example constitution of a plugged honeycomb structure 50 for use in the exhaust gas purifying device of the present invention, a plurality of prismatic columnar honeycomb segments 51 and 52 shown in FIG. 10 may be employed. Specifically, the plugged honeycomb structure 50 may include four inner honeycomb segments 51 in total combined in two columns and two rows, and twelve outer honeycomb segments 52 in total arranged around the four inner honeycomb segments 51 combined in the form of a square sectional shape, and the plugged honeycomb structure may be constructed finally by using the 16 honeycomb segments 51 and 52.

Here, plugging portions 56 are alternately arranged in respective cells 55 of second inflow side end faces 53 and second outflow side end faces 54 of the inner honeycomb segments 51, in the form of a lattice to form a checkerboard pattern. On the other hand, the plugging portions 56 are not arranged in any cells 55 of second inflow side end faces 53 and second outflow side end faces 54 of the outer honeycomb segments 52 and the cells are opened to the outside. Here, each of the second inflow side end faces 53 and the second outflow side end faces 54 of the four inner honeycomb segments 51 corresponds to an end face central region C in the present invention, whereas each of the second inflow side end faces 53 and the second outflow side end faces 54 of the twelve outer honeycomb segments 52 corresponds to an end face circumferential region O in the present invention. According to the above constitution, a pressure loss difference can easily be generated by the combination of the inner honeycomb segments 51 and the outer honeycomb segments 52.

Figure 11:
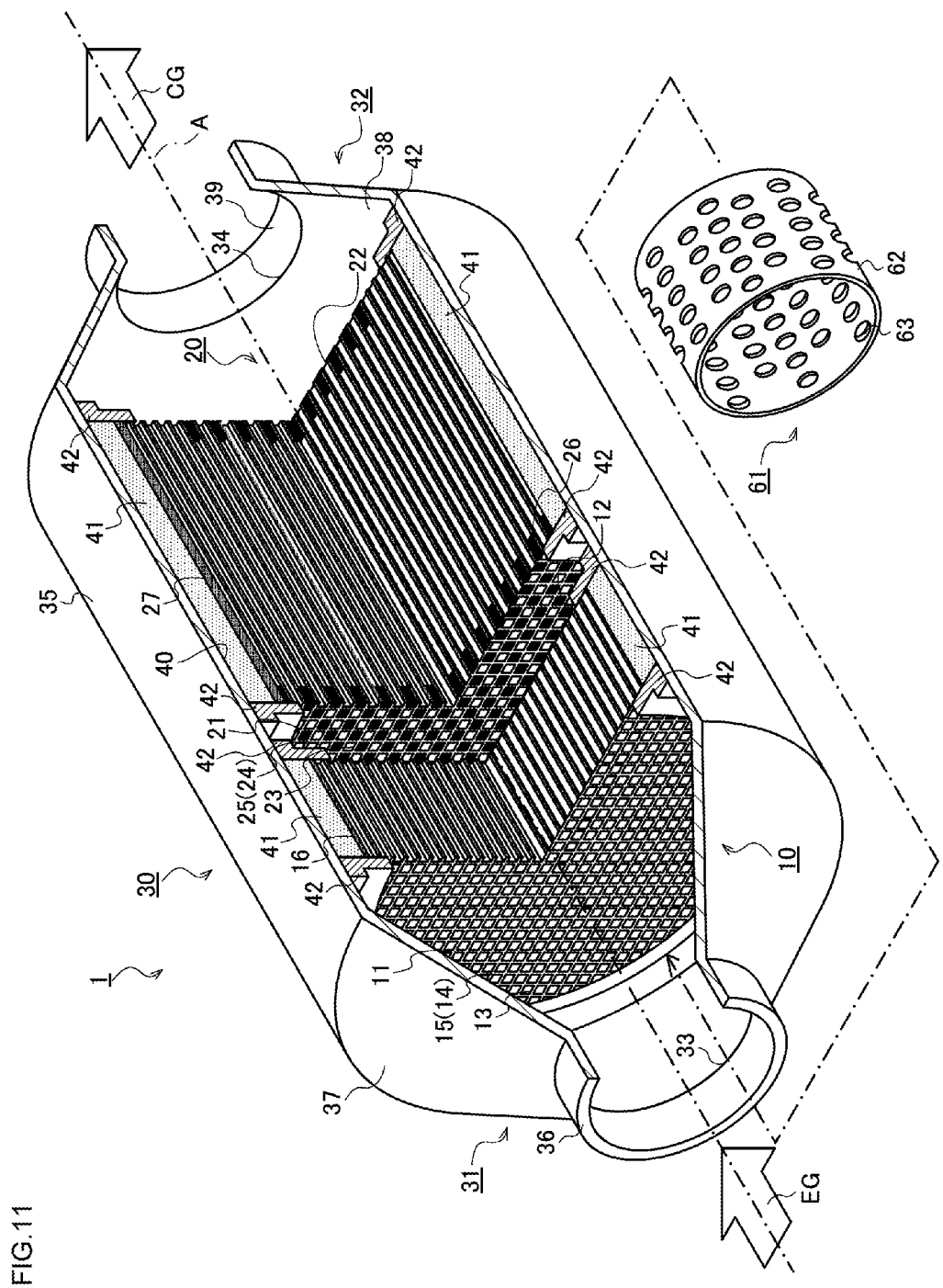
FIG. 11 is a partially exploded cutout perspective view in which a part of another example constitution of an exhaust gas purifying device including a rectifying portion in a can member is cut out along a central axis.
Figure 12:
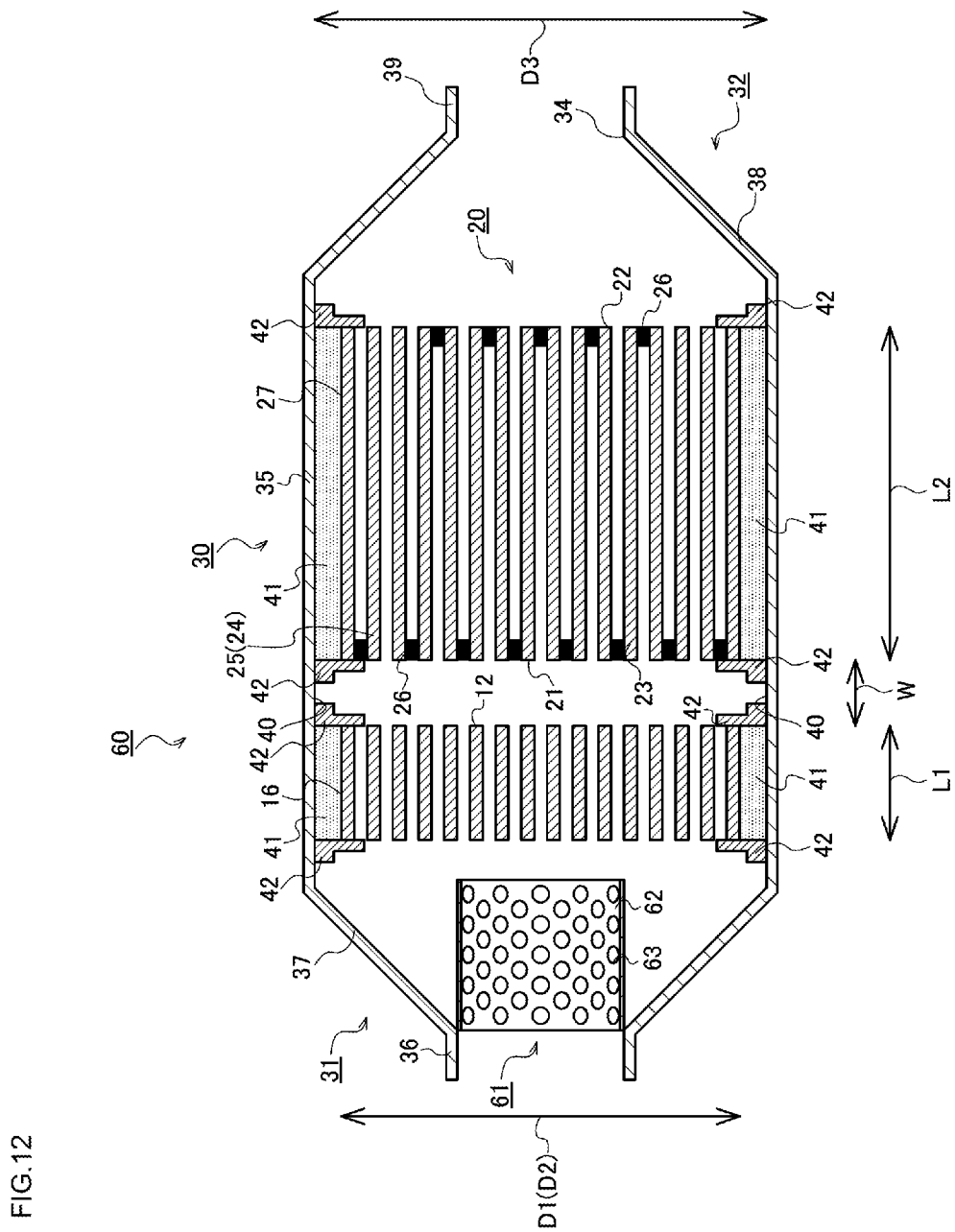
FIG. 12 is an explanatory view schematically showing a cross section of the exhaust gas purifying device of the other example constitution of FIG. 11 which is parallel to the central axis.

Additionally, as a still further example constitution of the present invention, such an exhaust gas purifying device 60 as shown in FIG. 11 and FIG. 12 may be constituted. It is to be noted that in FIG. 11 and FIG. 12, the same constitution as in the above-mentioned exhaust gas purifying device 1 is denoted with the same numerals and detailed description thereof is omitted.

In the exhaust gas purifying device 60 of the other example constitution, in addition to the constitution of the exhaust gas purifying device 1 shown in FIG. 1 and the like, there is attached a cylindrical rectifying portion 61 in which a plurality of round hole portions 63 are made in a cylindrical member 62 forming a circumferential wall, between an exhaust gas inflow portion 31 of a can member 30 and a first inflow side end face 11 of a honeycomb catalyst body 10. Here, an outer diameter of the cylindrical rectifying portion 61 matches an inner diameter of an inflow port 33 of the exhaust gas inflow portion 31, and an exhaust gas EG introduced into the can member 30 is controlled to surely pass through the rectifying portion 61. Furthermore, the rectifying portion 61 is constituted by using a metal material such as stainless steel so that the rectifying portion can resist the high-temperature exhaust gas EG even when exposed to the gas.

The rectifying portion 61 mentioned above is disposed in the can member 30, and hence it is possible to control the flow of the exhaust gas EG from the inflow port 33 to the first inflow side end face 11 of the honeycomb catalyst body 10. Further specifically, due to a difference in flow rate (or flow speed) of the exhaust gas EG introduced into the exhaust gas purifying device 60, a behavior of the exhaust gas EG in the can member 30 changes. That is, the exhaust gas EG at a predetermined flow rate (=in a low flow rate state) after start of the introduction slowly advances in the can member 30, and hence the exhaust gas easily flows along expansion of a diameter expanding portion 37 from the inflow port 33 in a direction perpendicular to an axial direction of the honeycomb catalyst body 10, i.e., along an expanding direction in a conical shape from the inflow port 33.

Here, in the usual direct injection type gasoline engine, it is known that a larger part of a particulate matter such as soot is generated in a state where the engine is not sufficiently warmed at the start of the engine or immediately after the start thereof. On the other hand, immediately after the start of the engine, there is performed driving in an idling state or a low rotation state in which an opening of an accelerator is suppressed and an amount of fuel to be supplied is decreased. Therefore, the exhaust gas EG to be introduced into the exhaust gas purifying device 60 is brought into the low flow rate state. Consequently, to securely trap a large amount of particulate matter generated in such a low flow rate state, the exhaust gas EG needs to be sent toward an end face central region C in which plugging portions 26 of a plugged honeycomb structure 20 are especially disposed.

As described above, in the plugged honeycomb structure (e.g., see FIG. 5) conforming to an arrangement standard in which the plurality of plugging portions 26 are arranged in the end face central region C, whereas the plugging portions 26 are not arranged in an end face circumferential region O, a pressure loss difference between the region C and the region O increases, and hence the exhaust gas EG easily flows toward the end face circumferential region O. As a result, the trapping efficiency of the plugged honeycomb structure 20 in the low flow rate state remarkably deteriorates, and there is a high possibility that the particulate matter is emitted as it is to the outside without being sufficiently trapped. This problem can be eliminated by the exhaust gas purifying device 60 of the other example constitution of the present invention.

That is, the cylindrical rectifying portion 61 is disposed between the inflow port 33 and the honeycomb catalyst body 10, so that there can be suppressed spreading of the exhaust gas EG in the direction perpendicular to the axial direction in the low flow rate state, and the exhaust gas EG can be guided toward the vicinity of a middle (the end face central region C) in the honeycomb catalyst body 10 and the plugged honeycomb structure 20. On the other hand, when the engine is sufficiently warmed and brought into a high flow rate state, the flow of the exhaust gas EG can be rectified so that a part of the exhaust gas EG is dispersed to flow toward the direction perpendicular to the axial direction through the plurality of hole portions 63 disposed in the rectifying portion 61.

The rectifying portion 61 for use in the exhaust gas purifying device 60 of the other example constitution of the present invention is not limited to the rectifying portion shown in FIG. 11 and FIG. 12. For example, FIG. 11 and the like show that the plurality of perfectly circular hole portions 63 are disposed in the cylindrical member 62, but the present invention is not limited to this example. Holes of various shapes such as elliptic holes, square holes and linear holes are usable, as long as the flow of the exhaust gas EG can be rectified in each of the low flow rate state and the high flow rate state. Furthermore, the number of the hole portions 63 to be made in the cylindrical member 62, a size such as a hole diameter, a layout of the respective hole portions 63 and the like can optionally be determined.

Hereinafter, examples of the exhaust gas purifying device of the present invention will be described, but the exhaust gas purifying device of the present invention is not limited to these examples.

EXAMPLES

Table 1 mentioned below shows a summary of a diameter, a length, L1/D1, a cell density, a partition wall thickness, a porosity, pore diameters and a catalyst loading ratio of a honeycomb catalyst body, a diameter, a length, L1/L2, a cell density, a partition wall thickness, a porosity, pore diameters, an arrangement standard and a catalyst loading ratio of a plugged honeycomb structure, and a distance between the honeycomb catalyst body and the plugged honeycomb structure (a distance between carriers) in each of Examples 1 to 18 and Comparative Example 1 of an exhaust gas purifying device of the present invention.

Comparative Example 1 indicates the exhaust gas purifying device using a plugged honeycomb structure constituted in a conventional arrangement standard pattern in which plugging portions are alternately arranged. Furthermore, Example 1 and Examples 7 to 17 indicate the exhaust gas purifying devices in each of which plugging portions are arranged in accordance with an arrangement standard of the above-mentioned third pattern P3, and Examples 2, 3 and 4 indicate the exhaust gas purifying devices in which plugging portions are arranged in accordance with arrangement standards of the above-mentioned fourth pattern P4, fifth pattern P5 and sixth pattern P6, respectively. On the other hand, Example 5 is the exhaust gas purifying device in which plugging portions are arranged in a first pattern P1 over the whole surface of a second inflow side end face and the plugging portions are arranged in a second pattern P2 only in the vicinity of a center of a second outflow side end face. Furthermore, Example 6 is the exhaust gas purifying device in which plugging portions are arranged in the second pattern P2 only in the vicinity of a center of a second inflow side end face and the plugging portions are arranged in the second pattern P2 only in the vicinity of a center of a second outflow side end face.

TABLE 1

| | Honeycomb catalyst body | | | | | | | | | Plugged honeycomb structure | | | | | | | | |
|---|---|---|---|---|---|---|---|---|---|---|---|---|---|---|---|---|---|---|
| | Dia./mm | Length/mm | L1/D1 | Cell density/Cells/cm² | Partition wall thickness/μm | Porosity/% | Pore dia./μm | Amount of catalyst to be loaded/g/L | Distance between carriers/mm | Dia./mm | Length/mm | L1/L2 | Cell density/Cells/cm² | Partition wall thickness/μm | Porosity/% | Pore dia./μm | Arrangement standard | Amount of catalyst to be loaded/g/L |
| Comparative Example 1 | 118 | 46 | 0.39 | 93 | 64 | 28 | 4 | 200 | 10 | 118 | 152 | 0.36 | 46.5 | 203 | 50 | 13 | Usual | None |
| Example 1 | 118 | 46 | 0.39 | 93 | 64 | 28 | 4 | 200 | 10 | 118 | 152 | 0.36 | 46.5 | 203 | 50 | 13 | P3 | None |
| Example 2 | 118 | 46 | 0.39 | 93 | 64 | 28 | 4 | 200 | 10 | 118 | 152 | 0.36 | 46.5 | 203 | 50 | 13 | P4 | None |
| Example 3 | 118 | 46 | 0.39 | 93 | 64 | 28 | 4 | 200 | 10 | 118 | 152 | 0.36 | 46.5 | 203 | 50 | 13 | P5 | None |
| Example 4 | 118 | 46 | 0.39 | 93 | 64 | 28 | 4 | 200 | 10 | 118 | 152 | 0.36 | 46.5 | 203 | 50 | 13 | P6 | None |
| Example 5 | 118 | 46 | 0.39 | 93 | 64 | 28 | 4 | 200 | 10 | 118 | 152 | 0.36 | 46.5 | 203 | 50 | 13 | Second inflow side end face: P1 (Whole surface) Second outflow side end face: P2 (Center) | None |
| Example 6 | 118 | 46 | 0.39 | 93 | 64 | 28 | 4 | 200 | 10 | 118 | 152 | 0.36 | 46.5 | 203 | 50 | 13 | Second inflow side end face: P2 Second outflow side end face: P2 (Center) | None |
| Example 7 | 144 | 13 | 0.09 | 140 | 64 | 28 | 4 | 400 | 10 | 144 | 152 | 0.09 | 46.5 | 203 | 50 | 13 | P3 | None |
| Example 8 | 118 | 83 | 0.7 | 93 | 64 | 28 | 4 | 300 | 10 | 118 | 152 | 0.55 | 46.5 | 203 | 50 | 13 | P3 | None |
| Example 9 | 144 | 15 | 0.1 | 140 | 64 | 28 | 4 | 400 | 10 | 144 | 110 | 0.13 | 46.5 | 203 | 50 | 13 | P3 | None |
| Example 10 | 118 | 70 | 0.59 | 93 | 64 | 28 | 4 | 300 | 10 | 118 | 142 | 0.49 | 46.5 | 203 | 50 | 13 | P3 | None |
| Example 11 | 118 | 70 | 0.59 | 93 | 127 | 35 | 4 | 300 | 10 | 118 | 142 | 0.49 | 46.5 | 203 | 50 | 13 | P3 | None |
| Example 12 | 118 | 70 | 0.59 | 93 | 101 | 35 | 4 | 300 | 10 | 118 | 142 | 0.49 | 46.5 | 203 | 50 | 13 | P3 | None |
| Example 13 | 118 | 46 | 0.39 | 93 | 101 | 28 | 4 | 300 | 10 | 118 | 152 | 0.3 | 46.5 | 203 | 50 | 13 | P3 | None |
| Example 14 | 118 | 46 | 0.39 | 62 | 64 | 28 | 4 | 220 | 30 | 118 | 152 | 0.3 | 46.5 | 203 | 50 | 13 | P3 | None |
| Example 15 | 118 | 46 | 0.39 | 62 | 64 | 28 | 4 | 220 | 20 | 118 | 152 | 0.3 | 46.5 | 203 | 50 | 13 | P3 | None |
| Example 16 | 118 | 46 | 0.39 | 93 | 64 | 28 | 4 | 200 | 10 | 118 | 152 | 0.3 | 46.5 | 203 | 65 | 20 | P3 | 130 |
| Example 17 | 118 | 46 | 0.39 | 93 | 64 | 28 | 4 | 200 | 10 | 118 | 152 | 0.3 | 46.5 | 203 | 65 | 20 | P3 | 120 |
| Example 18 | 118 | 46 | 0.39 | 93 | 64 | 28 | 4 | 200 | 10 | 118 | 152 | 0.36 | 46.5 | 203 | 50 | 13 | Second inflow side end face: P2 (Center) Second outflow side end face: P2 (Center) Rectifying portion added | None |

For the above-mentioned exhaust gas purifying device of each of Examples 1 to 18, (1) a purifying ratio, (2) the number of particles of a PM to be emitted and (3) a pressure loss were measured in accordance with measuring methods which will be described later, respectively, and the items (1) to (3) were evaluated, respectively. Furthermore, (4) a general evaluation of the exhaust gas purifying device was carried out on the basis of evaluations of (1) to (3).

(1) Measuring Method of Purifying Ratio

The exhaust gas purifying device concerned with each of the above-mentioned examples and comparative example was attached to an exhaust system of a car in which a direct injection type gasoline engine having a displacement of 2.0 liters was mounted. Afterward, there were measured emissions of carbon monoxide (CO), hydrocarbons (HC) and nitrogen oxides ($NO_x$) in an exhaust gas when the car was driven in accordance with driving conditions of Worldwide harmonized Light-duty driving Test Cycle (WLTC) as a vehicle test by use of a chassis dynamometer, to obtain an emission value. The obtained emission value was compared with a value of Comparative Example 1 of a reference, a case where a value of all components of carbon monoxide, hydrocarbons and nitrogen oxides was 20% or less was evaluated as "A", and a case where the value was in a range of 5 to 20% was evaluated as "B". It is to be noted that Table 2 shows "a purifying ratio (CO, HC, $NO_x$)" as an evaluation item concerned with measurement of the purifying ratio.

(2) Measuring Method of Number of Particles of PM to Be Emitted

The exhaust gas purifying device concerned with each of the examples and comparative example was attached to the exhaust system of the car in which the direct injection type gasoline engine having the displacement of 2.0 liters was mounted. Afterward, there was measured the number of the particles of the PM to be emitted in an exhaust gas when the car was driven in accordance with the driving conditions of Worldwide harmonized Light-duty driving Test Cycle (WLTC) as the vehicle test by use of the chassis dynamometer, on the basis of a method conforming to European EURO6 proposed regulations. Here, a case where the number of the particles of the PM to be emitted was $3\times10^{11}$ particles/km or less was evaluated as "A" and a case where the number was in a range of $3\times10^{11}$ to $6\times10^{11}$ particles/km was evaluated as "B".

(3) Measuring Method of Pressure Loss

In a chassis test of the direct injection type gasoline engine having the displacement of 2.0 liters, there was first attached, to the exhaust system, a flow-through type honeycomb structure having a cell density of 93 cells/$cm^2$, a partition wall thickness of 0.076 mm, a honeycomb diameter of 105.7 mm and a honeycomb length of 114 mm. At this time, a pressure loss during a full load operation of the engine was measured and this value was used as a reference value of the pressure loss. The exhaust gas purifying device concerned with each of the examples and comparative example was similarly attached to the exhaust system of the car in which the direct injection type gasoline engine having the displacement of 2.0 liters was mounted, and the pressure loss during the full load operation of the engine on the same conditions as described above was measured. Afterward, as compared with the beforehand measured reference value of the pressure loss, a case where an increase of the pressure loss was smaller than 5 kPa was evaluated as "A" and a case where the increase of the pressure loss was smaller than 10 kPa was evaluated as "B".

(4) General Evaluation

In the respective evaluations of (1) the purifying ratio (CO, HC, $NO_x$), (2) the number of the particles of the PM to be emitted and (3) the pressure loss mentioned above, a case where all the evaluations were A was regarded as the general evaluation "A" and a case where one of the evaluations was B was regarded as the general evaluation "B". Table 2 shows a summary of the evaluation results concerned with the above (1) to (4). It is to be noted that in Comparative Example 1, the evaluation is omitted. Furthermore, in the above evaluations of (1) to (4), "A" indicates "excellent", "B" indicates "good", and the evaluation of B indicates that the device has a sufficiently practical performance.

TABLE 2

|  | Purifying ratio (CO, HC, $NO_x$) | No. of particles of PM to be emitted/ Particles/km | Pressure loss | General evaluation |
| --- | --- | --- | --- | --- |
| Comparative Example 1 | — | — | — | — |
| Example 1 | A | A | A | A |
| Example 2 | A | A | A | A |
| Example 3 | A | A | A | A |
| Example 4 | A | A | A | A |
| Example 5 | A | B | A | B |
| Example 6 | A | B | A | B |
| Example 7 | B | A | A | B |
| Example 8 | B | A | A | B |
| Example 9 | A | A | A | A |
| Example 10 | A | A | A | A |
| Example 11 | B | A | A | B |
| Example 12 | A | A | A | A |
| Example 13 | A | A | B | B |
| Example 14 | B | A | A | B |
| Example 15 | A | A | A | A |
| Example 16 | A | A | B | B |
| Example 17 | A | A | A | A |
| Example 18 | A | A | A | A |

Arrangement Standards of Plugging Portions: Examples 1 to 6

As shown in Table 2, in the exhaust gas purifying device of each of Examples 1 to 4 in which the same honeycomb catalyst body and the same plugged honeycomb structure were disposed and the plugging portions were arranged in different arrangement standards of the third pattern P3 to the sixth pattern P6, respectively, each of the purifying ratio, the number of the particles of the PM to be emitted and the pressure loss was evaluated as "A" and the general evaluation was also A. That is, in the exhaust gas purifying device of the present invention, it is indicated that each of the arrangement standards of the plugging portions concerned with the third pattern P3 to the sixth pattern P6 suggested in advance has effects of an excellent purifying efficiency, a smaller number of the particles of the PM to be emitted and a low pressure loss. On the other hand, in a combination of the first pattern P1 and the second pattern P2 (Example 5) and in a combination of the second patterns P2 at the centers of the second inflow side end face and the second outflow side end face (Example 6), the evaluation of B was obtained.

Values of L1/D1 and L1/L2: Examples 7 to 10

In the exhaust gas purifying device in which a ratio (=L1/D1) of a length L1 of a honeycomb catalyst body in a central axis direction to a diameter D1 of the honeycomb catalyst body deviated from a range of 0.1 to 0.6 and in the exhaust gas purifying device in which a ratio (=L1/L2) of the length L1 of the honeycomb catalyst body in the central axis direction to a length L2 of a plugged honeycomb structure in the central axis direction deviated from a range of 0.1 to 0.5 (Examples 7 and 8), the evaluation of the purifying ratio (CO, HC, $NO_x$) was "B". In the exhaust gas purifying device in which L1/D1 was in the range of 0.1 to 0.6 and L1/L2 was in the range of 0.1 to 0.5 as stipulated in the present invention (Examples 9 and 10), the evaluation of the purifying ratio (CO, HC, $NO_x$) was "A". It has been confirmed that the purifying ratio (CO, HC, $NO_x$) is influenced by a relation between the length and the diameter of the honeycomb catalyst body for use in the exhaust gas purifying device and a relation in length between the honeycomb catalyst body and the plugged honeycomb structure.

Partition Wall Thickness of Honeycomb Catalyst Body: Examples 11 and 12

In the exhaust gas purifying device in which the partition wall thickness of the honeycomb catalyst body was 127 μm (Example 11), the evaluation of the purifying ratio (CO, HC, $NO_x$) was "B". On the other hand, in the exhaust gas purifying device in which the partition wall thickness was 101 μm (Example 12), the evaluation of the purifying ratio (CO, HC, $NO_x$) was "A". It has been confirmed that the value of the purifying ratio (CO, HC, $NO_x$) is influenced by the partition wall thickness of the honeycomb catalyst body.

Porosity of Plugged Honeycomb Structure: Example 13

In the exhaust gas purifying device in which the porosity of the partition walls of the honeycomb catalyst body was larger than the porosity of the partition walls of the plugged honeycomb structure (Example 13), it was confirmed that the pressure loss increased. It can be considered that when the porosity of the plugged honeycomb structure on a downstream side is smaller than that of the honeycomb catalyst body on an upstream side, permeability of the exhaust gas is impaired and the pressure loss increases.

Distance between Honeycomb Catalyst Body and Plugged Honeycomb Structure (Distance between Carriers): Examples 14 and 15

In the exhaust gas purifying device in which the distance between the carriers was 30 mm as stipulated in the present invention (Example 14), it was confirmed that a purifying efficiency decreased, and in the exhaust gas purifying device in which the distance between the carriers was in the above-mentioned range (Example 15), it was confirmed that an excellent purifying efficiency was indicated. That is, it is preferable that the distance between the carriers of the honeycomb catalyst body and the plugged honeycomb structure is adjusted into the above-mentioned range.

Amount of Catalyst to Be Loaded: Examples 16 and 17

In the exhaust gas purifying device in which the amount of the catalyst to be loaded onto the plugged honeycomb structure was in excess of 120 g/L (Example 16), it was confirmed that the pressure loss increased, and in the exhaust gas purifying device in which the amount of the catalyst to be loaded onto the plugged honeycomb structure was 120 g/L or less (Example 17), it was confirmed that an excellent pressure loss was indicated.

Effect by Rectifying Portion: Example 18

In the exhaust gas purifying device of the other example constitution (Example 18) in which a cylindrical rectifying portion was disposed in the can member of the exhaust gas purifying device of Example 6, the evaluation of the number of the particles of the PM to be emitted enhanced from B to A as compared with Example 6. That is, improvement of the number of the particles of the PM to be emitted can be recognized due to the addition of the rectifying portion, and it can be recognized that each evaluation of A is maintained without influencing the purifying ratio or the pressure loss. Therefore, as the general evaluation, the exhaust gas purifying device of Example 18 was A.

As described above in Examples 1 to 18, it is possible to construct the exhaust gas purifying device in which each of the evaluation items of the purifying ratio, the number of the particles of the PM to be emitted and the pressure loss is satisfactorily A or B or does not have any practical problems.

An exhaust gas purifying device of the present invention can efficiently remove a particulate matter included in an exhaust gas, can exert a high purifying performance even immediately after start of an engine without increasing a pressure loss, and is especially useful in performing purification of the exhaust gas of a direct injection type gasoline engine.

Description of Reference Numerals 1 and 60: exhaust gas purifying device, 10: honeycomb catalyst body, 11: first inflow side end face, 12: first outflow side end face, 13, 23, 23a, 23b, 23c, 23d, 23e and 55: cell, 14 and 24: partition wall, 15: first honeycomb substrate, 16 and 27: outer circumferential wall surface, and 50: plugged honeycomb structure, 21 and 53: second inflow side end face, 22 and 54: second outflow side end face, 25: second honeycomb substrate, 26 and 56: plugging portion, 30: can member, 31: exhaust gas inflow portion, 32: purified gas emitting portion, 33: inflow port, 34: emitting port, 35: can member main body, 36: introduction pipe, 37: diameter expanding portion, 38: diameter reducing portion, 39: emission tube, 40: inner circumferential wall surface, 41: cushion material, 42: stopper member, 51: inner honeycomb segment, 52: outer honeycomb segment, 61: rectifying portion, 62: cylindrical member, 63: hole portion, C: end face central region, CG: purified gas, EG: exhaust gas, O: end face circumferential region, D1 and D2: diameter, D3: inner diameter, L1 and L2: length, M: region boundary line, P1: first pattern, P2: second pattern, P3: third pattern, P4: fourth pattern, P5: fifth pattern, P6: sixth pattern, and W: distance.

What is claimed is:
1. An exhaust gas purifying device comprising:
a honeycomb catalyst body including a first honeycomb substrate having latticed partition walls defining a plurality of cells extending from a first inflow side end face to a first outflow side end face, and a catalyst loaded onto the first honeycomb substrate, both ends of the cells being opened, respectively;
a plugged honeycomb structure including a second honeycomb substrate having latticed partition walls defining a plurality of cells extending from a second inflow side end face to a second outflow side end face, and a plurality of plugging portions arranged to plug open ends of the cells in the second inflow side end face and/or the second outflow side end face in accordance with a predetermined arrangement standard; and a can member formed to receive the honeycomb catalyst body and the plugged honeycomb structure at a downstream position of the honeycomb catalyst body, and including an exhaust gas inflow portion in which an inflow port is disposed at a position to face the first inflow side end face of the honeycomb catalyst body and into which an exhaust gas of a purification target flows, and an exhaust gas emitting portion in which an emission port is disposed at a position to face the second outflow side end face of the plugged honeycomb structure and from which the purified gas is emitted, wherein the plugged honeycomb structure is designed so that a pressure loss of an end face central region in at least one of the second inflow side end face and the second outflow side end face is larger than a pressure loss of an end face circumferential region positioned around the end face central region.

2. The exhaust gas purifying device according to claim 1, wherein the end face central region includes a region in which the inflow port is vertically projected on the second inflow side end face, and a central region area of the end face central region is set to be equal to an inflow port sectional area in the inflow port of the exhaust gas inflow portion which faces the second inflow side end face via the honeycomb catalyst body or to be larger than the inflow port sectional area.

3. The exhaust gas purifying device according to claim 1, wherein open frontal areas of each of the cells in the end face central region and the end face circumferential region are different.

4. The exhaust gas purifying device according to claim 1, wherein the plugged honeycomb structure comprises:

at least one prismatic columnar inner honeycomb segment; and a plurality of prismatic columnar outer honeycomb segments which surround the inner honeycomb segment, the second inflow side end face and/or the second outflow side end face in the inner honeycomb segment corresponds to the end face central region, and the second inflow side end face and/or the second outflow side end face in each of the outer honeycomb segments corresponds to the end face circumferential region.

5. The exhaust gas purifying device according to claim 1, wherein the arrangement standard of the plugging portions is at least one of a structure in which the plugging portions are arranged in the form of a lattice to alternately plug the cells in the second inflow side end face and/or the second outflow side end face and a structure in which the plugging portions are arranged to vary a sectional area of each of the cells in the second inflow side end face and a sectional area of each of the cells in the second outflow side end face, respectively.

6. The exhaust gas purifying device according to claim 1, wherein a porosity of the partition walls of the first honeycomb substrate is set to be smaller than a porosity of the partition walls of the second honeycomb substrate.

7. The exhaust gas purifying device according to claim 1, wherein a value of a ratio of a length of the honeycomb catalyst body in a central axis direction to a length of the plugged honeycomb structure in the central axis direction is from 0.1 to 0.5.

8. The exhaust gas purifying device according to claim 1, wherein a value of a ratio of a length of the honeycomb catalyst body in a central axis direction to a diameter of the honeycomb catalyst body is from 0.1 to 0.6.

9. The exhaust gas purifying device according to claim 1, wherein the plugged honeycomb structure has the catalyst loaded onto the second honeycomb substrate, an amount of the catalyst to be loaded per unit volume onto the first honeycomb substrate of the honeycomb catalyst body is from 200 to 400 g/L, and an amount of the catalyst to be loaded per unit volume onto the second honeycomb substrate of the plugged honeycomb structure is from 10 to 120 g/L.

10. The exhaust gas purifying device according to claim 1, wherein a partition wall thickness of the first honeycomb substrate is in a range of 50.8 to 101.6 μm.

11. The exhaust gas purifying device according to claim 1, wherein a distance between the honeycomb catalyst body and the plugged honeycomb structure is from 1 to 20 mm.

12. The exhaust gas purifying device according to claim 1, which further comprises:

a cylindrical rectifying portion which is disposed between the exhaust gas inflow portion of the can member and the first inflow side end face of the honeycomb catalyst body and in which a plurality of hole portions are made in a circumferential wall, wherein there is adjusted the flow of the exhaust gas taken in from one end of the rectifying portion which faces the inflow port in a direction perpendicular to an axial direction of the honeycomb catalyst body and the plugged honeycomb structure.

* * * * *